(12) United States Patent
Wada

(10) Patent No.: US 7,839,472 B2
(45) Date of Patent: Nov. 23, 2010

(54) LIQUID CRYSTAL DEVICE AND ELECTRONIC APPARATUS

(75) Inventor: Hiroshi Wada, Azumino (JP)

(73) Assignee: Sony Corporation, Tokyo (JP)

(*) Notice: Subject to any disclaimer, the term of this patent is extended or adjusted under 35 U.S.C. 154(b) by 283 days.

(21) Appl. No.: 11/976,994

(22) Filed: Oct. 30, 2007

(65) Prior Publication Data

US 2008/0204639 A1 Aug. 28, 2008

(30) Foreign Application Priority Data

Feb. 23, 2007 (JP) .............................. 2007-043372
Aug. 23, 2007 (JP) .............................. 2007-216766

(51) Int. Cl.
*G02F 1/1335* (2006.01)

(52) U.S. Cl. ...................................... 349/114; 349/128

(58) Field of Classification Search ........................ None
See application file for complete search history.

(56) References Cited

U.S. PATENT DOCUMENTS

| 7,486,351 | B2 | 2/2009 | Itou et al. | |
| 7,616,279 | B2* | 11/2009 | Jang et al. | 349/123 |
| 2007/0046879 | A1* | 3/2007 | Hirota et al. | 349/134 |

FOREIGN PATENT DOCUMENTS

| JP | A 2004-177897 | 6/2004 |
| JP | A 2005-338256 | 12/2005 |
| JP | A 2005-338264 | 12/2005 |

* cited by examiner

*Primary Examiner*—Richard H Kim
(74) *Attorney, Agent, or Firm*—K&L Gates LLP

(57) ABSTRACT

Disclosed herein is a liquid crystal device including: first and second substrates which face each other; a liquid crystal layer interposed between the first substrate and the second substrate; a reflection display region which is provided in one region of a sub-pixel configuring a control unit of a driving display by the first and second substrates with the liquid crystal layer interposed therebetween and performs a display by reflected light; a transmission display region which is provided in the other region of the sub-pixel and performs a display transmitted light; a layer thickness adjustment film which is provided on the second substrate in correspondence with the reflection display region and defines the thickness of the liquid crystal layer to be different from that in the transmission display region; and an alignment film which is provided between the second substrate and the liquid crystal layer so as to cover the layer thickness adjustment film and is subjected to a rubbing process, wherein the layer thickness adjustment film has a step difference surface at a boundary between the reflection display region and the transmission display region, and, when the rubbing process is performed in a direction opposed to the step difference surface and an angle between an extending direction of the step difference surface and a rubbing direction is α, a relationship of $70° \leq \alpha \leq 110°$ is satisfied.

10 Claims, 14 Drawing Sheets

LIQUID CRYSTAL DEVICE AND ELECTRONIC APPARATUS

The entire disclosure of Japanese Patent Application Nos. 2007-043372, filed Feb. 23, 2007 and 2007-216766, filed Aug. 23, 2007 are expressly incorporated by reference herein.

BACKGROUND

1. Technical Field

The present invention relates to a semi-transmissive reflective liquid crystal device which includes a layer thickness adjustment film for defining the thickness of a liquid crystal layer in a reflective display region and an electronic apparatus using the liquid crystal device.

2. Related Art

Currently, a liquid crystal device is widely used in electronic apparatuses such as mobile telephones or personal digital assistants (PDA). For example, the liquid crystal device is used as a display device for displaying information on the electronic apparatus. The liquid crystal device controls a voltage applied to a liquid crystal layer provided between a pair of substrates for each pixel, controls alignment of liquid crystal molecules in the liquid crystal layer for each pixel, modulates polarized light transmitting through the liquid crystal layer for each pixel, and displays an image on the surface of any one of the substrates.

In the related art, a semi-transmissive reflective liquid crystal device is known (for example, see JP-A-2005-338256 (page 6, FIG. 2)). In this liquid crystal device, a reflective display region is formed by a common wiring line functioning as a reflective plate, a transmissive display region is formed by a region in which the common wiring line is not provided, and a reflective display and a transmissive display are selectively performed by selectively applying driving voltages to electrodes in these regions.

In the liquid crystal device disclosed in JP-A-2005-338256, light transmitting through the transmissive display region transmits through the liquid crystal layer one, but light transmitting through the reflective display region transmits through the liquid crystal layer twice. Accordingly, a difference in retardation ($\Delta nd$: $\Delta n$ is a refractive index phase difference and d is the thickness of the liquid crystal layer) occurs by the reflected light and the transmitted light so as to make the display characteristics of the reflective display and the transmissive display ununiform. In order to compensate for the difference in retardation, in the liquid crystal device disclosed in JP-A-2005-338256, a built-in retardation film is provided in the reflective display region as a layer thickness adjustment film for adjusting the thickness d of the liquid crystal layer.

The liquid crystal device disclosed in JP-A-2005-338256 is an in-plane field type liquid crystal device in which a pixel electrode and a common electrode are formed on a substrate and the built-in retardation film is provided on a substrate which faces the substrate, on which the electrodes are formed, as the layer thickness adjustment film. The liquid crystal molecules of the liquid crystal layer are aligned in homogeneous alignment by rubbing alignment films provided on a pair of substrates.

The layer thickness adjustment film has a step difference surface at a boundary between the reflective display region and the transmissive display region, and the step difference surface is a sloped surface. This sloped surface is formed when the layer thickness adjustment film is formed using a photolithography method. In liquid crystal device disclosed in JP-A-2005-338256, the step difference surface of the layer thickness adjustment film extends perpendicular to a signal wiring line. In JP-A-2005-338256, several examples of an angle between the extending direction of the step difference surface of the layer thickness adjustment film and a rubbing direction for aligning the liquid crystal molecules are described and, among them, the extending direction of the step difference surface and the rubbing direction are 75° or 90°. However, an orientation relationship between the rubbing direction and the step difference surface, that is, whether the rubbing process is performed in a direction opposed to the step difference surface or from a mountain portion to a valley portion of the step difference surface, is not disclosed.

The present inventors found that, if the orientation relationship is not adequately set, a sufficient alignment force cannot be obtained in the step difference surface of the layer thickness adjustment film, the alignment of the liquid crystal molecules is disturbed, and contrast deteriorates due to the disturbance of the alignment, through an experiment for the orientation relationship between the step difference surface of the layer thickness adjustment film and the rubbing direction.

SUMMARY

An advantage of some aspects of the invention is that it obtains a high-quality display with high contrast by adequately adjusting an orientation relationship between a layer thickness adjustment film provided in a reflective display region and a rubbing direction in a semi-transmissive reflective liquid crystal device and an electronic apparatus using the same.

According to an aspect of the invention, there is provided a liquid crystal device including: first and second substrates which face each other; a liquid crystal layer interposed between the first substrate and the second substrate; a reflection display region which is provided in one region of a sub-pixel configuring a control unit of a driving display by the first and second substrates with the liquid crystal layer interposed therebetween and performs a display by reflected light; a transmission display region which is provided in the other region of the sub-pixel and performs a display transmitted light; a layer thickness adjustment film which is provided on the second substrate in correspondence with the reflection display region and defines the thickness of the liquid crystal layer to be different from that in the transmission display region; and an alignment film which is provided between the second substrate and the liquid crystal layer so as to cover the layer thickness adjustment film and is subjected to a rubbing process, wherein the layer thickness adjustment film has a step difference surface at a boundary between the reflection display region and the transmission display region, and, when the rubbing process is performed in a direction opposed to the step difference surface and an angle between an extending direction of the step difference surface and a rubbing direction is $\alpha$, a relationship of $70° \leq \alpha \leq 110°$ is satisfied.

As widely known, the rubbing process is performed by rubbing the surface of the alignment film using a rubbing member. According to the liquid crystal device of the invention, since the rubbing process is performed from a direction opposed to the step difference surface of the layer thickness adjustment film, that is, the valley portion (transmission display region) of the step difference surface, to the mountain portion (reflection display region) thereof in a range of 70° to 110° (that is, 90°±20°), it is possible to apply strong rubbing strength to the step difference surface, increase an alignment force and prevent alignment unevenness. As a result, it is possible to obtain high contrast. Unlike the invention, if the rubbing process is performed from the mountain portion to the valley portion of the step difference surface, the rubbing strength applied to the step difference surface weakens and thus a display failure may be caused. In contrast, according to the present invention, since strong rubbing strength can be applied to the step difference surface, it is possible to prevent a display failure due to a rubbing failure.

According to an experiment of the present inventor, it can be seen that, if the angle between the extending direction of the step difference surface and the rubbing direction becomes smaller than 70°, a display failure may occur due to a rubbing failure. Even when the angle between the extending direction of the step difference surface and the rubbing direction becomes larger than 110°, a display failure may occur due to a rubbing failure. Accordingly, in order to prevent the display failure due to the rubbing failure, the angle between the extending direction of the step difference surface and the rubbing direction is in a range of 70° to 110°.

In the liquid crystal device, the step difference surface may be sloped at an angle smaller than 90° with respect to the surface of the second substrate. The layer thickness adjustment film is formed on the second substrate by a patterning method based on a photolithography method. In this case, a sloped surface may be formed in the end (that is, the step difference portion) of the layer thickness adjustment film. When the sloped surface is subjected to the rubbing process, in order to apply a strong rubbing force to the sloped surface, the rubbing process may be performed in a direction opposed to the sloped surface and may be performed in a range of 70° to 110° with respect to the extending direction of the sloped surface.

The liquid crystal device may further include first and second electrodes which are provided on the first substrate so as to generate an electric field. The second electrode may have a plurality of electrode lines which are arranged in parallel with gaps interposed therebetween. In addition, when an angle between the gaps and the rubbing direction is $\beta$, a relationship of $5° \leq \beta \leq 20°$ may be satisfied.

The first electrode and the second electrode are provided on one substrate and the second electrode includes the plurality of electrode lines which are arranged in parallel with the gaps interposed therebetween such that an electric field (a lateral electric field) can be generated in a plane parallel to the substrate. Such an operation mode may be a fringe field switching (FFS) mode or an in-plane switching (IPS) mode. In this operation mode, it is possible to reduce a threshold voltage for causing an alignment change and stabilize an alignment change at the time of applying an on voltage, by restricting the angle between the extending direction of the gaps provided in the second electrode (the extending direction of the electrode lines) and the rubbing direction in a range of 5° to 20°. The direction of the electric field is perpendicular to the extending direction of the gaps and the electrode lines. If the rubbing direction is sloped by 5° to 20° with respect to the extending direction of the gaps, the rubbing process is performed at an angle of 85° to 70° with respect to the direction of the electric field.

The gaps and the electrode lines may be provided in only the second electrode or in both of the first electrode and the second electrode. In a case where the gaps and the electrode lines are provided in the second electrode and the first electrode is the planar electrode (solid electrode), the electrode lines overlap the other planar electrode in plan view. Even when the gaps and the electrode lines are provided in both of the first electrode and the second electrode, the electrode lines of the both electrodes may overlap each other in plan view. An operation mode realized by an electrode structure in which the electrode lines provided in any one of the first and second electrodes overlap the electrode lines provided in the other of the first and second electrodes in plan view is the FFS mode. An operation mode realized by an electrode structure in which the gaps and the electrode lines are provided in both the first electrode and the second electrode and gaps are formed in the electrode lines in a state in which the electrode lines of the both electrodes do not overlap each other in plan view is the IPS mode.

In the liquid crystal device including the gaps and the electrode lines in the second electrode, the gaps of the second electrode may linearly extend parallel to a longitudinal direction of the sub-pixel, the rubbing direction may be sloped at 5° to 20° with respect to the longitudinal direction of the sub-pixel, and the step difference surface of the layer thickness adjustment film may extend parallel to a short-side direction of the sub-pixel. By this configuration, since the step difference surface of the layer thickness adjustment film extends parallel to the short-side direction of the sub-pixel, it is possible to easily form a pattern on the substrate due to a simple pattern shape.

In the liquid crystal device including the gaps and the electrode lines in the second electrode, the gaps of the second electrode linearly may extend parallel to a longitudinal direction of the sub-pixel, the rubbing direction may be sloped at 5° to 20° with respect to the longitudinal direction of the sub-pixel, and the step difference surface of the layer thickness adjustment film may be sloped with respect to a short-side direction of the sub-pixel while being perpendicular to the rubbing direction. By this configuration, since the step difference surface of the layer thickness adjustment film and the rubbing direction is accurately 90°, it is possible to apply a strong rubbing force to the step difference surface so as to prevent an alignment failure of liquid crystal molecules with certainty.

In the liquid crystal device including the gaps and the electrode lines in the second electrode, the gaps of the second electrode may be bent at a middle portion of the second electrode in a longitudinal direction of the sub-pixel, the gaps positioned at one region of the middle portion may be sloped by 5° to 20° with respect to the longitudinal direction of the sub pixel in a counter-clockwise direction in plan view, and the gaps positioned at the other region of the middle portion may be sloped by 5° to 20° with respect to the longitudinal direction of the sub pixel in a clockwise direction in plan view, the rubbing direction may be parallel to the longitudinal direction of the sub-pixel, and the step difference surface of the layer thickness adjustment film may extend parallel to a short-side direction of the sub-pixel.

By this configuration, since two domains in which the slopes of the gaps are linearly symmetrical in one sub-pixel, it is possible to increase viewability of a display a high visual region and improve visual characteristics. In addition, since the step difference surface of the layer thickness adjustment film and the rubbing direction is accurately 90°, it is possible to apply a strong rubbing force to the step difference surface so as to prevent an alignment failure of liquid crystal molecules with certainty.

In the liquid crystal device including the gaps and the electrode lines in the second electrode, the gaps of the second electrode may linearly extend parallel to a longitudinal direction of the sub-pixel, the rubbing direction may be sloped at 5° to 20° with respect to the longitudinal direction of the sub-pixel, and the step difference surface of the layer thickness adjustment film may be sloped with respect to a short-side direction of the sub-pixel while being perpendicular to the rubbing direction, and linearly extends between the plurality of sub-pixels. By this configuration, the slope of the step difference surface of the layer thickness adjustment film is repeated in the plurality of sub-pixels, instead of each sub-pixel. Accordingly, it is possible to prevent unevenness in rubbing strength in a boundary between the sub-pixels.

In a case where the liquid crystal device has color filters including, for example, three colored films of red (R), green (G) and blue (B), when the step difference surface of the layer thickness adjustment film linearly extends among the plurality of sub-pixels, the plurality of sub-pixels corresponding to the plurality of colored films may configure one pixel. For example, since four colors of R, G, B and C configure one pixel, the slopes of the step difference surfaces of the layer thickness adjustment film are linearly continuous in one pixel corresponding to the four colors.

In the liquid crystal device, a switching element may be provided on the first substrate and an on voltage and an off voltage may be applied to the liquid crystal layer in the sub-pixel by turning on/off the switching element. Examples of the switching element may include a 3-terminal switching element such as a thin-film transistor (TFT) or a 2-terminal switching element such as a thin-film diode (TFD). The switching element may be connected to a scanning line or a signal line and a longitudinal direction of the sub-pixel may be parallel to an extending direction of the scanning line or the signal line.

In the liquid crystal device including a first electrode and a second electrode provided on the first substrate, the layer thickness adjustment film may include a retardation film and retardation of the retardation film may be a ½ wavelength. The optimal retardation And of the reflection display region is a ¼ wavelength of a wide band. In the invention, the layer thickness adjustment film is provided on the second substrate in correspondence with the reflection display region. The retardation of the reflection display region is the ¼ wavelength of the wide band optimal to a reflection display by the retardation film of the layer thickness adjustment film and the liquid crystal layer.

According to another aspect of the invention, there is provided an electronic apparatus including the above-described liquid crystal device. Examples of the electronic apparatus may include, for example, a mobile telephone or a personal digital assistant. According to the liquid crystal device of the invention, since a display failure due to a rubbing failure can be solved, it is possible to obtain a high-quality display even in the electronic apparatus using the liquid crystal device.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment of Liquid Crystal Device

Hereinafter, an active matrix type liquid crystal device of a semi-transmissive reflective type, which is capable of achieving a color display, according to an embodiment of the invention will be described as an example of a liquid crystal device. In the present embodiment, the invention applies to a liquid crystal device using a channel etching type polysilicon TFT of a single gate structure. In the liquid crystal device according to the present embodiment, a fringe field switching (FFS) mode which is an in-plane field type operation mode is employed. The invention is not limited to this embodiment. In each view used for following description, the scales of a plurality of components are different from actual scales in order to easily understand features.

Figure 1:
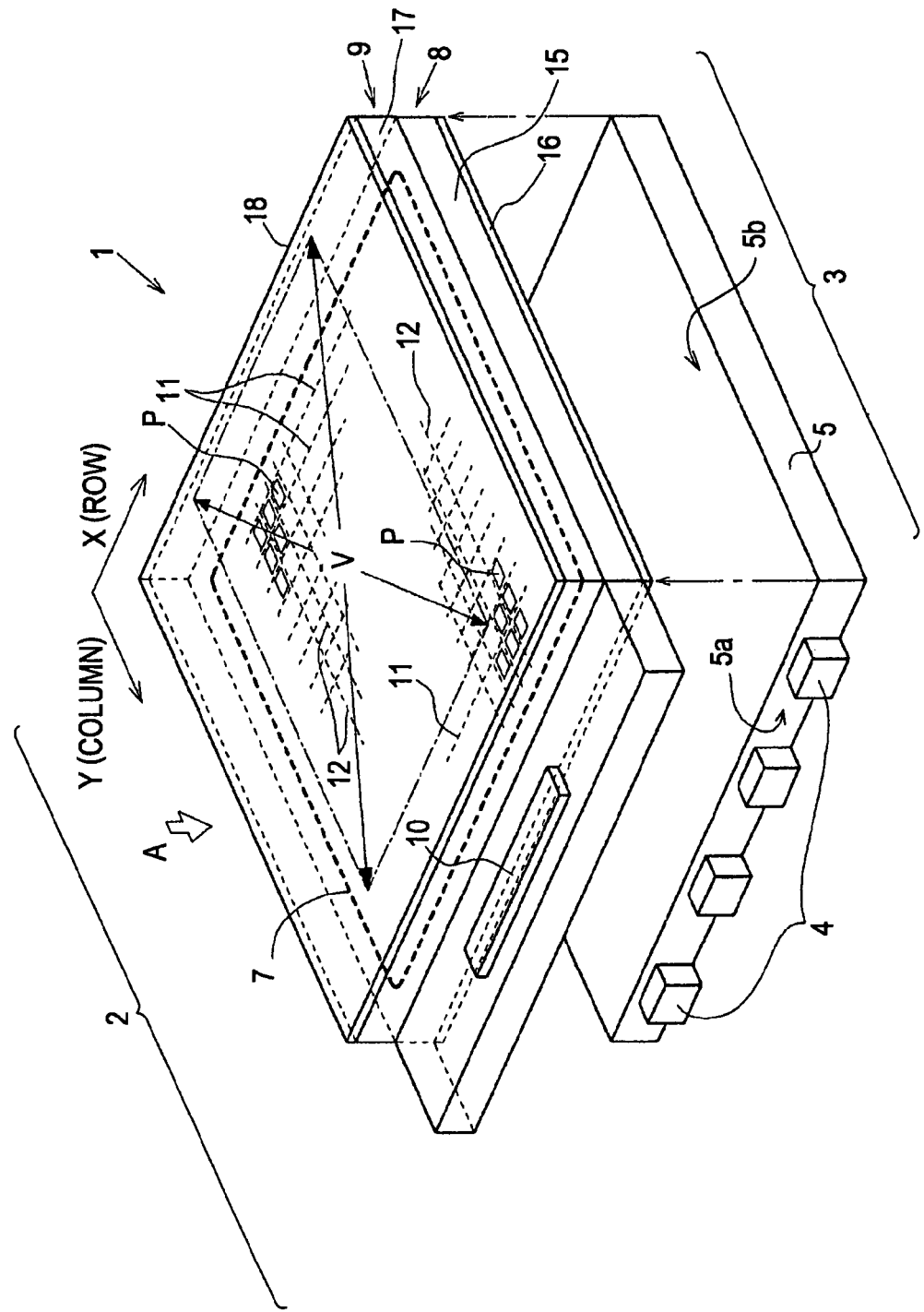
FIG. 1 is a perspective view showing a liquid crystal device according to an embodiment of the invention.

FIG. 1 shows a liquid crystal device according to an embodiment of the invention. In FIG. 1, the liquid crystal device 1 has a liquid crystal panel 2 and an illumination device 3. In the liquid crystal device 1, a side denoted by an arrow A is a viewing side, and the illumination device 3 is provided on the liquid crystal panel 2 at a side opposed to the viewing side and functions as a backlight. The illumination device 3 includes a light-emitting diode (LED) 4 as a light source and a light guide body 5 formed of translucent resin. Light emitted from the LED 4 is made incident on the light guide body 5 through a light incident surface 5a of the light guide body 5 and is emitted through a light emitting surface 5b to become planar light, which is fed to the liquid crystal panel 2. The illumination device 3 may use a linear light source such as a cold cathode tube, instead of a point-shaped light source such as the LED 4.

The liquid crystal panel 2 has a rectangular shape or a square shape when viewed in a direction denoted by the arrow and includes a device substrate 8 as a first substrate and a color filter substrate 9 as a second substrate, both of which are adhered to each other by an annular (that is, a frame-shaped) seal material A. The device substrate 8 as the first substrate is the device substrate on which switching elements are formed. The color filter substrate 9 as the second substrate is the color filter substrate 9 on which color filters are formed. In the present embodiment, the color filter substrate 9 is provided at the viewing side and the device substrate 8 is provided at the rear side when viewed at the viewing side. The seal material 7 is, for example, thermosetting or ultraviolet ray curing resin such as epoxy resin and is formed in a desired annular shape by screen printing.

In a region which is the inside of the liquid crystal panel 2 and is surrounded by the seal material 7, a plurality of scanning lines 11 which are parallel to one another extend in a row direction X. A plurality of signal lines 12 which are parallel to one another extend in a column direction Y. A plurality of dot-shaped (that is, island-shaped) regions surrounded by the plurality of scanning lines 11 and the plurality of signal lines 12 are arranged in a matrix when viewed in the direction denoted by the arrow A. Sub-pixels P are provided in these regions. These sub-pixels P are arranged in a matrix such that a display region V is formed. In FIG. 1, the sub-pixels P are enlarged compared with actual sub-pixels. The row direction X and the column direction Y are respectively a horizontal direction and a vertical direction when a viewer views an image display of the liquid crystal panel 2.

The sub-pixel P is a region which is a switching unit of a bright display (white display) and a dark display (black display) and a plurality of sub-pixels P forms one pixel which is a display unit. For example, sub-pixels P are formed in correspondence with red (R), green (G) and blue (B) and three sub-pixels of R, G and B form one pixel. Four sub-pixels P of R, G, B and cyan (C) may form one pixel. In the present embodiment, the three sub-pixels of R, G and B form one pixel.

The device substrate 8 has an extension portion which externally extends from the color filter substrate 9. On the extension portion, a driving IC 10 is mounted by a chip-on-glass (COG) technology using an anisotropic conductive film (ACF). The driving IC 10 receives a control signal from an external control circuit, supplies scanning signals to the scanning lines 11, and supplies data signals to the signal lines 12. The driving IC 10 may be connected to the liquid crystal panel 2 via a flexible printed circuit (FPC), instead of being connected to the liquid crystal panel 2 by the COG technology.

Figure 2:
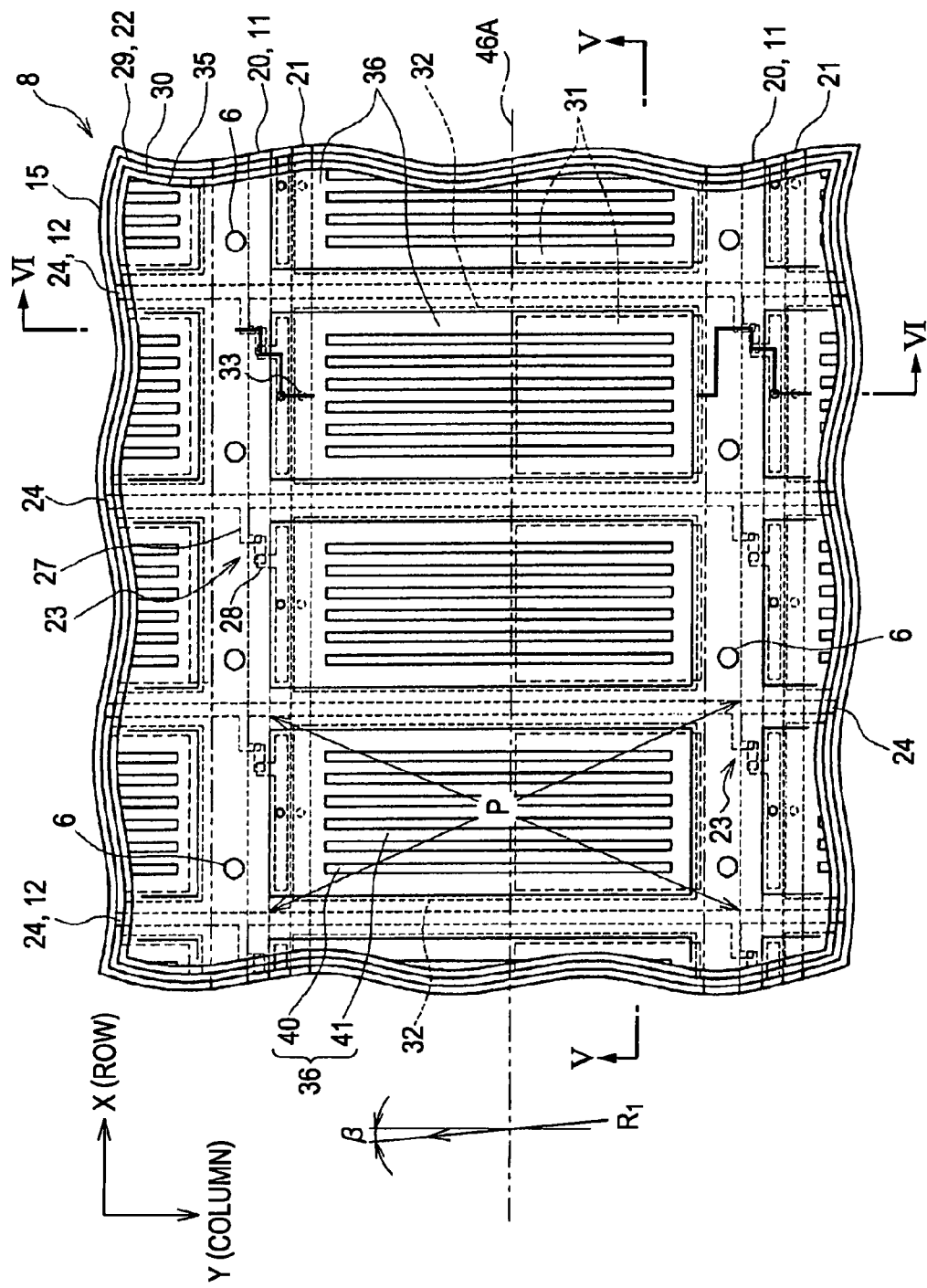
FIG. 2 is a plan view showing main portions of one substrate in the liquid crystal device shown in FIG. 1.
Figure 3:
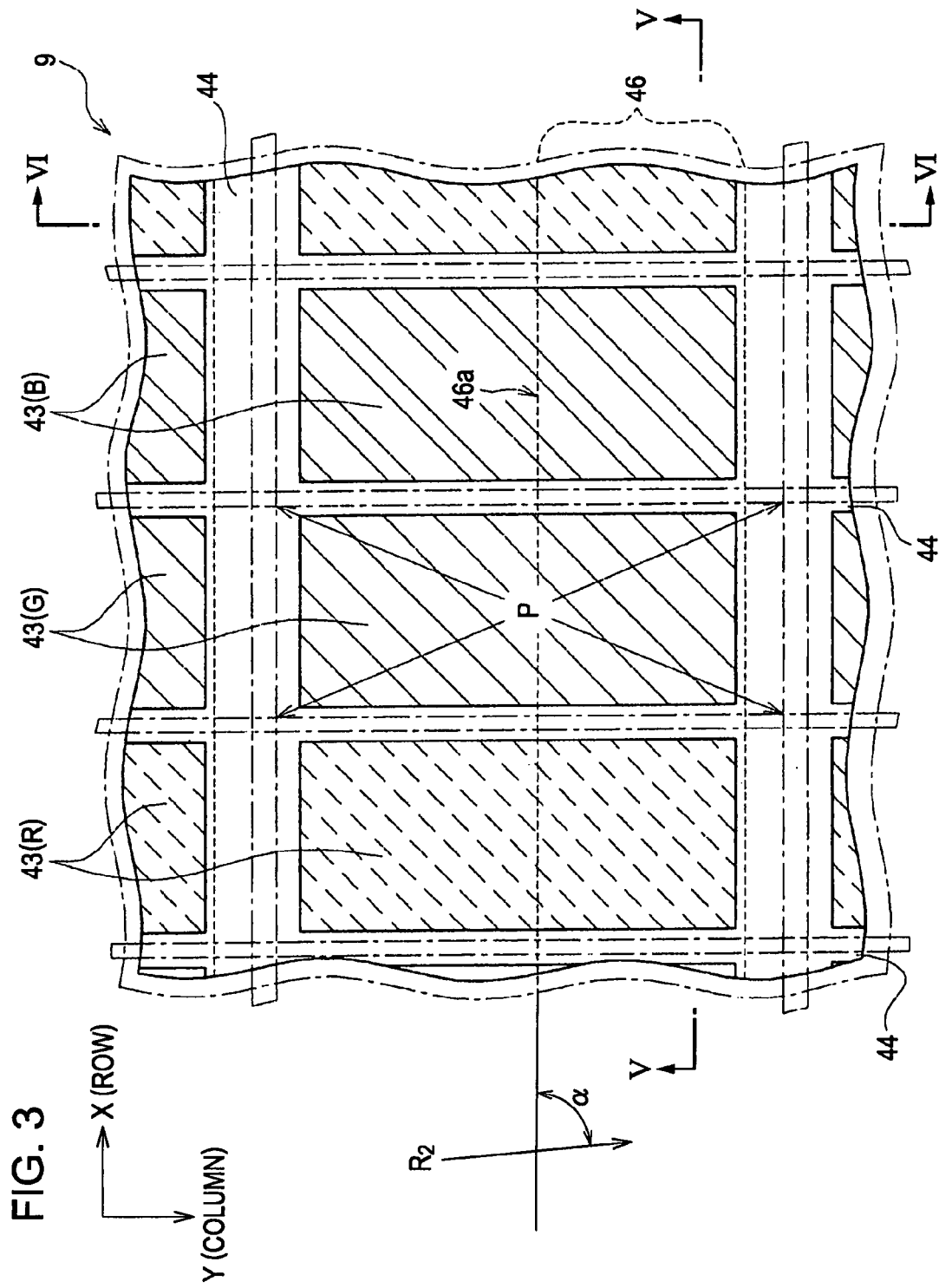
FIG. 3 is a plan view showing main portions of the other substrate in the liquid crystal device shown in FIG. 1.
Figure 4:
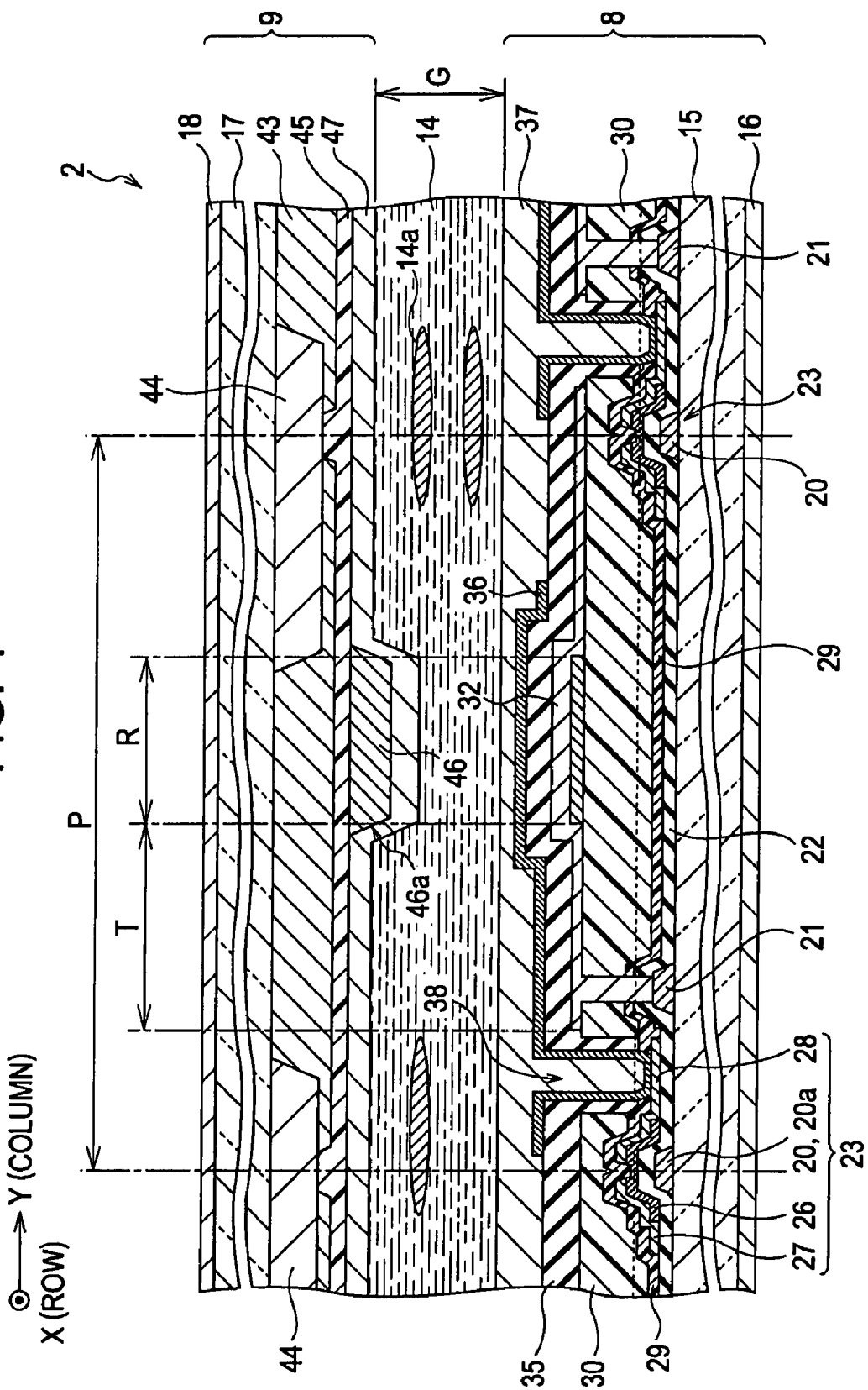
FIG. 4 is a cross-sectional view taken along line IV-IV of FIGS. 2 and 3.
Figure 5:
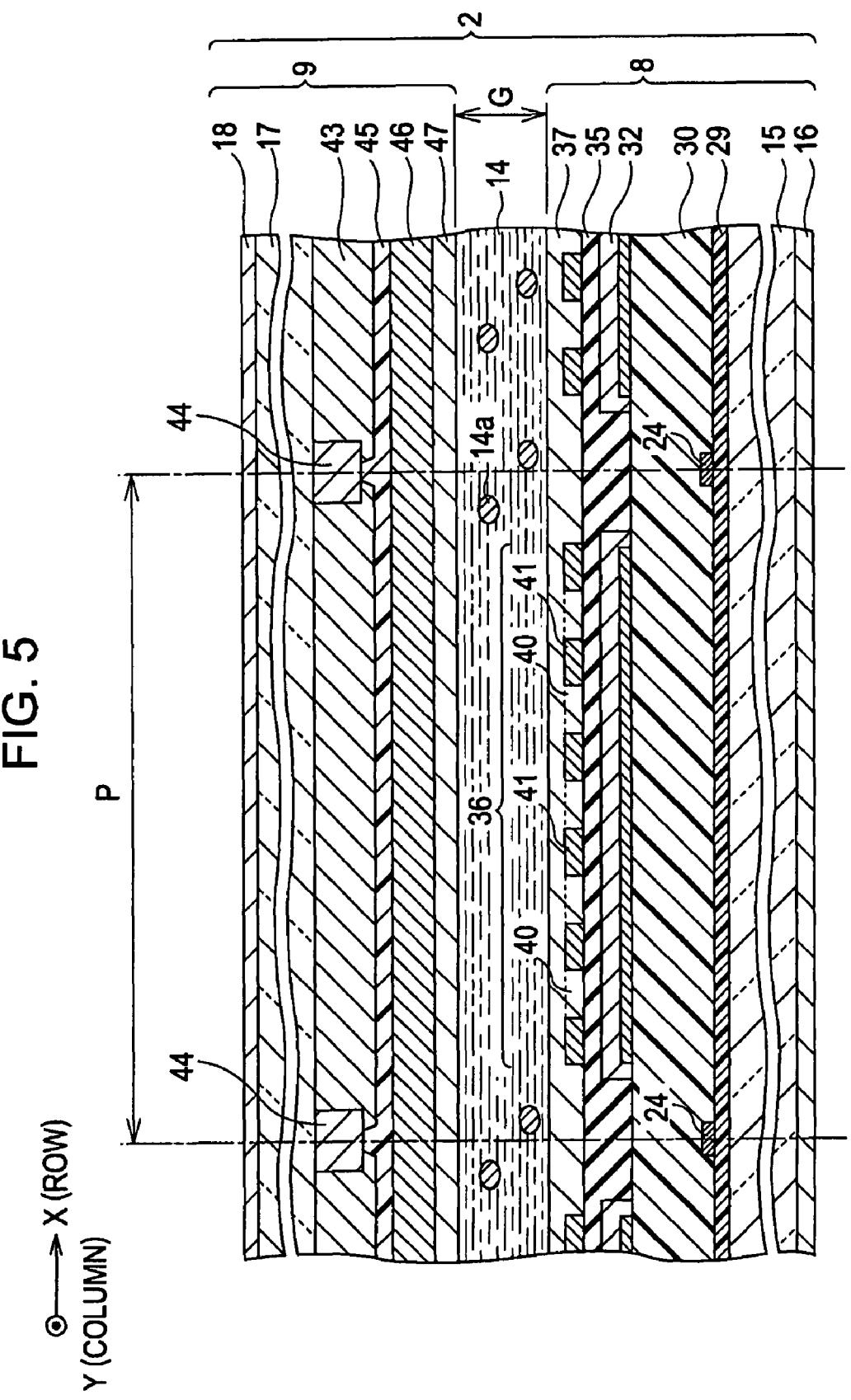
FIG. 5 is a cross-sectional view taken along line V-V of FIGS. 2 and 3.

FIG. 2 shows a state in which the plane structure in the vicinity of one pixel (three sub-pixels) formed on the device substrate 8 shown in FIG. 1 is viewed in a direction normal to the substrate at the side of the liquid crystal layer. FIG. 3 shows a state in which the plane structure in the vicinity of one pixel (three sub-pixels) formed on the color filter substrate 9 shown in FIG. 1 is viewed in the direction normal to the substrate at the viewing side (that is, the side opposed to the liquid crystal layer). That is, FIG. 3 shows a state in which the color filter substrate 9 is viewed from the same side as FIG. 2. FIG. 4 shows a cross-sectional structure in the column direction Y of one sub-pixel P taken along line IV-IV of FIGS. 2 and 3. FIG. 5 shows a cross-sectional structure in the row direction X of one sub-pixel P taken along line V-V of FIGS. 2 and 3.

In FIG. 1, a gap having a predetermined thickness, that is, a cell gap, is formed between the device substrate 8 and the color filter substrate 9. The thickness of the cell gap is held by gap materials included in the seal material 7 and spacers (not shown) laid on the surfaces of the device substrate 8 or the color filter substrate 9. The spacers may be formed by dispersing spherical members on the device substrate 8 or the color filter substrate 9 or by forming photo spacers on the device substrate 8 or the color filter substrate 9 by a photolithography process. The photo spacers are provided so as not to disturb the display, as shown in FIG. 2.

The cell gap G formed above is denoted by a reference numeral G in FIG. 4. In the cell gap G, a liquid crystal layer 14 is formed by filling a liquid crystal. In the present embodiment, a nematic liquid crystal having positive dielectric anisotropy ($\Delta \epsilon > 0$) is used as the liquid crystal. The thickness of the liquid crystal layer is 5 μm. A reference numeral 14a denotes liquid crystal molecules 14a included in the liquid crystal. The liquid crystal layer 13 has a homogeneous alignment by a rubbing process.

The device substrate 8 has a first translucent substrate 15 which has a rectangular shape or a square shape when viewed from the direction normal to the substrate. The first transparent substrate 15 is, for example, made of transparent glass or transparent plastic. A first polarization plate 16 is attached to the outer surface of the first transparent substrate 15. Meanwhile, the color filter substrate 9 has a second transparent substrate 17 which has a rectangular shape or a square shape when viewed from the direction normal to the substrate. The second transparent substrate 17 is, for example, made of transparent glass or transparent plastic. A second polarization plate 18 is attached to the outer surface of the second transparent substrate 17.

Gate lines 20 and common lines 21 are provided on the inner surface (that is, the liquid-crystal-side surface) of the first translucent substrate 15. As shown in FIG. 2, the plurality of gate lines are arranged in the row direction X in parallel. The plurality of common lines are arranged in the row direction X parallel to the gate lines 20. The gate lines 20 function as the scanning lines 11 shown in FIG. 1.

A gate insulating film 22 is formed on the first translucent substrate 15 so as to cover the gate lines 20 and the common lines 21. Thin-film transistors (TFTs) 23 are formed on the gate insulating film 22 as a switching element and source lines 24 (see FIG. 2) are formed on the gate insulating film 22 perpendicular to the gate lines 20. The source lines 24 function as the signal lines 12 shown in FIG. 1.

In FIG. 4, each TFT 23 is formed of a channel etching type polysilicon TFT of a bottom gate structure and a single gate structure. Each TFT 23 includes a gate electrode 20a which is a portion of the gate line 20, the gate insulating film 22, a semiconductor film 26 made of polysilicon, a source electrode 27 and a drain electrode 28. The source electrode 27 and the drain electrode 28 are electrodes of the TFT 23 which is a switching element. The source electrode 27 is branched from the source line 24, as shown in FIG. 2. Although the TFT 23 according to the present embodiment has the bottom gate structure, the TFT 23 may have a top gate structure.

In FIG. 4, a passivation film 29 is provided on the gate insulating film 22 as a protective film which is a planar resin film for covering the TFTs 23 and the source lines 24 and a resin film 30 is formed thereon. A reflective film 31 is formed on the resin film 30. The reflective film 31 is provided in a band shape over the plurality of sub-pixels in the vertical direction of FIG. 4. A common electrode 32 is provided on the reflective film 31 as a first electrode. The common electrode 32 is formed in a rectangular shape (solid shape) in which the length is longer in the column direction Y when viewed from the direction normal to the substrate. The common electrode 32 is connected to a common line 21 via a through-hole provided in the resin film 30, the passivation film 29 and the gate insulating film 22.

A capacitive insulating film 35 is provided on the common electrode 32, a pixel electrode 36 is formed on the capacitive insulating film 35 as a second electrode, and an alignment film 37 is formed thereon. The pixel electrode 36 is connected to a drain electrode 28 of the TFT 23 via a through-hole 38 provided in the resin film 30 and the passivation film 29. The outer periphery shape of the pixel electrode 36 which is viewed in the direction normal to the substrate is a rectangular shape in which the length is longer in the column direction Y. As shown in FIG. 2, the pixel electrode 36 has a plurality of electrode lines 41, which are arranged in parallel, slits 40 which are straight-line-shaped gaps. The slits 40 and the electrode lines 41 are arranged in a straight-line shape in the longitudinal direction (that is, the column direction Y) of the sub-pixel P.

In the present embodiment, in FIG. 2, the source line 24 which is the signal line is connected to the source electrode 27 of the TFT 23 such that the drain electrode 28 of the TFT 23 is connected to the pixel electrode 36. Alternatively, the drain electrode may be connected to the signal lines and the source electrode may be connected to the pixel electrode 36.

Since the common electrode 32 has the planar shape, the electrode lines 41 of the pixel electrode 36 overlap the common electrode 32 when viewed in the direction normal to the substrate. Although, in the present embodiment, the slit 40 has a closed opening, the slit 40 may have a shape in which one side is opened. In this case, the pixel electrode 36 has a comb shape. The slit 40 may have a shape in which both sides are opened.

In FIG. 4, the reflective film 31 is, for example, formed by photoetching processing of chrome (Cr) aluminum (Al). Preferably, an irregular shape pattern for scattering light is formed in the surface of the reflective film 31. The irregular shape pattern is, for example, formed by forming an irregular shape pattern in the surface of the resin film 30 by a photolithography process and forming the reflective film 31 on the irregular shape pattern. The common electrode 32 and the pixel electrode 36 are formed by photoetching processing of translucent metal oxide such as indium tin oxide. The gate insulating film 22, the passivation film 29, the resin film 30 and the capacitive insulating film 35 are, for example, formed of acrylic resin, silicon nitride (SiN) or silicon oxide ($SiO_2$). The alignment film 37 is, formed of polyimide.

As described above, in the present embodiment, the common electrode 32 and the pixel electrode 36 are formed on the device substrate 8 and an electric field parallel to the surface of the device substrate 8, that is a lateral electric field, is formed by applying a predetermined voltage to the common electrode 32 and the pixel electrode 36 and the alignment of the liquid crystal molecules 14a of the liquid crystal layer is controlled in a surface parallel to the substrate by the lateral electric field. In the present embodiment, a region corresponding to the reflective film 31 is a reflection display region R and a region in which the common electrode 32 and the pixel electrode 36 overlap each other in plan view excluding the reflection display region R is a transmission display region T.

Next, in FIG. 4, colored films 43 configuring color filters are formed on the inner surface (that is, the liquid crystal side surface) of a second translucent substrate 17 and a light-shielding film 44 is formed in the periphery thereof. Each of the colored films 43 is formed in a rectangular or square dot shape (that is, an island shape) corresponding to each sub-pixel P. The plurality of colored films 43 are arranged in a matrix in the row direction X and the column direction Y. The light-shielding film 44 is formed in a lattice shape so as to surround the colored films 43. The light-shielding film 44 shields the light a region excluding the reflection display region R and the transmission display region.

The colored films 43 are set to optical characteristics for transmitting light of red (R), green (G) and blue (B) and the colored films 43 of R, G and B are arranged in a stripe arrangement. In the present specification, the reference numerals R, G and B attached to the colored films 43 indicate red, green and blue of the colored films, respectively. The stripe arrangement indicates an arrangement in which the same colors of R, G and B are arranged in the column direction Y and one color of R, G and B are sequentially arranged in the row direction X. Instead of the stripe arrangement, the colored films 43 may arranged in the other arrangement, such as a mosaic arrangement or a delta arrangement. The optical characteristics of the colored films 43 are not limited to three colors of R, G and B and three colors of cyan (C), magenta (M) and yellow (M) or at least four colors may be used. The light-shielding film 44 is formed of a resin film by overlapping the colored films of two colors or three colors. Alternatively, the light-shielding film 44 may be formed of a metal film such as Cr.

Colored regions of R, G and B are respectively a red-type-hue colored region, a green-type-hue colored region, and a blue-type hue colored region among a visible light region (380 to 780 nm) in which the color is changed according to a wavelength. For example, the colored regions of R, G and B have the peak of the wavelength of "B" of 415 nm to 500 nm, the peak of the wavelength of "G" of 455 nm to 535 nm and the peak of the wavelength of "R" of 600 nm, respectively. Since the present invention is not limited to the above colored regions, the other wavelength regions may be selected if necessary.

In FIGS. 4 and 5, an overcoat layer 45 is formed on the colored films 43 and the light-shielding film 44. A retardation film 46 is formed on the overcoat layer 45 in a region (that is, the reflection display region R) opposed to the reflective film 32 of the device substrate 8 as a layer thickness adjustment film. An alignment film 47 is formed on the overcoat layer 45 so as to cover the retardation film 46.

The colored films 43 are, for example, formed by patterning a material obtained by mixing pigment or dye to a photosensitive resin material using a photolithography method. The overcoat layer 45 is, for example, formed of acrylic resin. The alignment film 47 is formed of polyimide. The overcoat layer 45 functions as a planarization film for planarizing the surface of the color filters and a protective film for preventing a configuration material of the color filters from being mixed into the liquid crystal.

The retardation film 46 is, for example, formed such that a portion corresponding to the reflection display region R remains using a patterning method based on a photolithograph method after liquid crystal molecules are uniformly formed with a thickness of 2 μm to 3 μm. Both ends of the retardation film 46 are step difference surfaces 46a and the step difference surfaces 46a are formed to be sloped at the time of the patterning process based on the photolithography method. The step difference surfaces 46a extend in the row direction X (the vertical direction of the drawing) at an angle of 90° from the surface of the overcoat layer 45.

The step difference surfaces 46a are shown by a dotted line in FIG. 3 and a virtual line in FIG. 2. Although, in FIG. 2, the step difference surfaces 46a and the side of the reflective film 31 are slightly shifted from each other, the step difference surfaces 46a actually overlap the side of the reflective film 31 in plan view. In order to set the retardation And of the reflection display region R to a ¼ wavelength of a wide band optimal to a reflection display by the retardation film 46 and the liquid crystal layer in the reflection display region R, the retardation Δnd of the retardation film 46 is set to a ½ wavelength and the retardation Δnd of the liquid crystal layer of the reflection display region R is set to a ¼ wavelength.

In addition, the thickness of the retardation film 46 is set such that the retardation Δnd of the liquid crystal of the reflection display region R becomes the ¼ wavelength. If the thickness of the liquid crystal layer in the reflection display region R cannot be suitably obtained by the thickness of the retardation film 46 as the layer thickness adjustment film, the resist which is used as a mask when forming the retardation film 46 using the photolithography method may be left by an adequate thickness.

Although not shown, the retardation film 46 may not function as the layer thickness adjustment film and a separate layer thickness adjustment film may be provided. For example, the retardation film 46 may be provided on the liquid crystal side surface of the color filter substrate 9 and an additional retardation film 46 may be provided on the outer surface of the color filter substrate 9. In this case the rubbing process of the color filter substrate 9 is performed in a direction opposed to the step difference surfaces 46*a* of the retardation film 46. The retardation film 46 provided outside the color filter substrate 9 may be formed by adhering a film-shaped retardation film, instead of the patterning process of the photolithography method.

Figure 6:
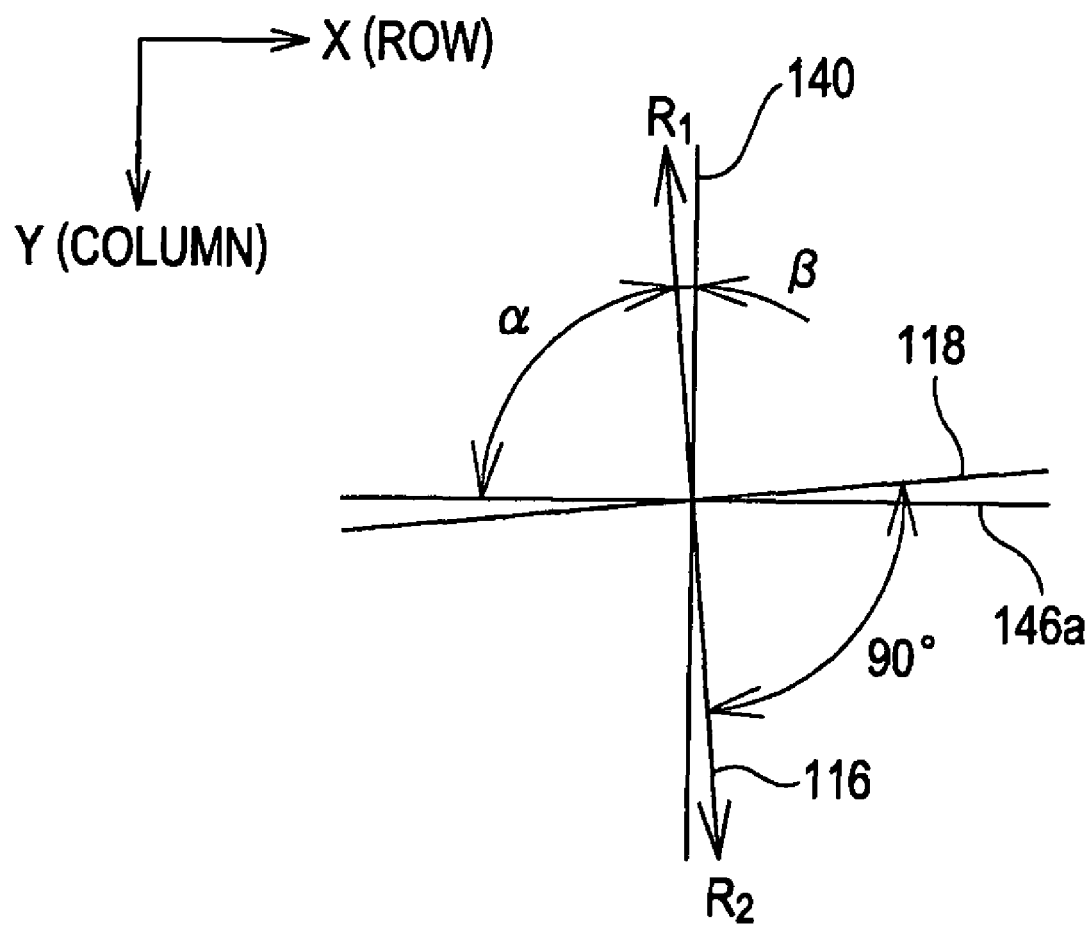
FIG. 6 is a view showing an axis arrangement relationship of optical axes in the liquid crystal device shown in FIG. 1.

FIG. 6 shows an axis arrangement relationship. A reference numeral 140 denotes an extending direction of the slits 40 (the extending direction of the electrode lines 41) as the gap of the pixel electrode 36 shown in FIG. 2. A reference numeral R1 denotes the rubbing direction at the side of the device substrate 8 shown in FIG. 2. A reference numeral R2 denotes the rubbing direction at the side of the color filter substrate 9 shown in FIG. 3. A reference numeral 146*a* denotes the extending direction of the step difference surfaces 46*a* of the retardation film 46 as the layer thickness adjustment film. A reference numeral 116 denotes the direction of a transmission axis of the first polarization plate 16 at the side of the backlight. A reference numeral 118 denotes the direction of a transmission axis of the second polarization plate 18 at the viewing side.

Now, the axis arrangement relationship will be described with reference to FIG. 6. The slits 40 of the pixel electrode 36 shown in FIG. 2 extend in a longitudinal direction of the sub-pixel P (the vertical direction of FIG. 2) (the direction 140 of FIG. 6). An angle β between the slits 40 and the rubbing direction R1 at the side of the device substrate 8 is defined as β=5° (the direction R1 of FIG. 6). The rubbing direction R2 of the color filter substrate 9 shown in FIG. 3 is anti-parallel to the rubbing direction R1 of the device substrate 8 (the direction R2 of FIG. 6) and is opposed to the step difference surfaces 46*a* of the retardation film 46 as the layer thickness adjustment film (see a direction 146*a* of FIG. 6). The step difference surfaces 46*a* extend in the row direction X and extends in a direction perpendicular to the extending direction of the slits 40 (that is, the electrode lines 41) of the pixel electrode 36 shown in FIG. 2. Accordingly, an angle α between the rubbing direction R2 of the color filter substrate shown in FIG. 3 and the step difference surfaces 46*a* of the retardation film 46 is 85°.

In FIG. 4, the transmission axis of the first polarization plate 16 of the device substrate 8 side (backlight side) is perpendicular to that of the second polarization plate 18 of the color filter substrate 9 side (viewing side) (the direction 116 and the direction 118 of FIG. 6), the transmission axis 118 of the second polarization plate 18 of the viewing side is perpendicular to the rubbing directions R1 and R2, and the transmission axis of the first polarization plate of the backlight side is parallel to the rubbing directions R1 and R2.

In the liquid crystal device 1 according to the present embodiment, in the transmission display, planar light emitted from a light emitting surface 5*b* of the light guide body 5 of the illumination device 3 shown in FIG. 1 is fed into the transmission region T. The fed light is converted into linearly polarized light by the first polarization plate 16 and is made incident on the liquid crystal layer 14. When an off voltage is applied, since the vibration direction of the polarized light is parallel to the liquid crystal alignment direction (see the reference numerals 116, R1 and R2 of FIG. 6), a phase difference is not given by the liquid crystal layer 14. The linearly polarized light is absorbed by the second polarization plate 18 and is not emitted. When an off voltage is applied, the phase of the polarized light incident to the liquid crystal layer 14 is modulated by the liquid crystal layer 14 and the polarized light transmits through the second polarization plate 18, thereby realizing a bright display. In the present embodiment, since the alignment of the liquid crystal molecules is controlled in the surface parallel to the substrate when the on voltage is applied, a brighter display of a wide viewing angle is realized compared with a vertical electric field control method for controlling the alignment of the liquid crystal molecules in the vertical direction. Since the retardation film 45 does not exist in the transmission display region T, it is possible to realize a dark display of a wide angle, without generating a phase difference in a viewing direction.

In contrast, in a reflection display, light is fed to the color filter substrate 9. The light is converted into linearly polarized light by the second polarization plate 18, passes through the liquid crystal layer 14, reflects from the reflective film 31, transmits through the second polarization plate 18, and transmits to the viewing side.

In the reflection display region R, when the off voltage is applied, the light passing through the second polarization plate 18, the retardation film 46 and the liquid crystal layer 14 is converted into circularity polarized light, which is made incident on the reflective film 31. After reflection, the polarized light incident to the second polarization plate 18 is absorbed by the second polarization plate and is not emitted. When the on voltage is applied, it is possible to realize a dark display of low transmissivity. When the on voltage is applied, the phase of the polarized light incident to the liquid crystal layer 14 is modulated by the liquid crystal layer 14 and the polarized light transmits through the second polarization plate 18, thereby realizing a bright display.

As described above, according to the present embodiment, in FIG. 3, since the angle between the rubbing direction R2 and the step difference surfaces 46*a* of the retardation film 46 is 85°, it is possible to apply strong rubbing strength to the step difference surface 46*a*, increase an alignment force, prevent alignment unevenness, and obtain high contrast in the step difference surfaces 46*a*. If the rubbing process is performed from the mountain portion to the valley portion of the step difference surfaces 46*a* unlike the present embodiment, the rubbing strength applied to the step difference surfaces 46*a* may be decreased so as to cause a display failure. According to the present embodiment, since strong rubbing strength is applied to the step difference surfaces 46*a*, it is possible to prevent a display failure due to a rubbing failure.

In addition, although, in the present embodiment, the angle α between the step difference surface and the rubbing direction is 85°, the angle α may be changed according to the angle β between the rubbing direction R1 and R2 and the slits 40. In the FFS mode, the angle β between the rubbing direction R1 and R2 and the slits 40 is preferably in a range of 5° to 20°. The step difference surfaces 46*a* are set to an adequate angle with respect to the rubbing directions R1 and R2. According to an experiment of the present inventor, it can be seen that the display failure does not occur due to the rubbing failure if the angle α between the rubbing direction and the extending direction of the step difference surfaces 46*a* is larger than 70° (=90°−20°) and is smaller than 110° (=90°+20°).

Next, in FIG. 4, the step difference surfaces 46*a* of the retardation film 46 which are the layer thickness adjustment film are the sloped surface which is sloped with respect to the surface of the color filter substrate 9 at an angle smaller than 90°. According to the present embodiment, it is possible to give an adequate rubbing angle to the step difference surfaces 46a by performing the rubbing process in the direction opposed to the step difference surfaces 46a.

Next, in FIG. 2, the angle β between the rubbing direction R1 of the device substrate 8 and the extending direction of the slits 40 of the pixel electrode 36 is 5°. The rubbing direction R1 at the side of the device substrate 8 is anti-parallel to the rubbing direction R2 at the side of the color filter substrate 9 shown in FIG. 3. By this angle relationship, it is possible to stabilize an alignment change at the time of applying the on voltage and reduce a threshold voltage for causing the alignment change. In addition, the angle β between the slits of the pixel electrode and the rubbing direction is in a range 5° to 20°, the same effect can be obtained.

From FIG. 1, the embodiment shown in FIG. 5 relates to the liquid crystal device of the FFS mode in which the electrode lines 41 of the pixel electrode 36 overlaps the common electrode 32 in plan view. The invention is not limited to the FFS mode and is applicable to a liquid crystal device of an IPS mode. In the IPS mode, slits and electrode lines are provided even in the common electrode 32, the electrode lines 41 of the pixel electrode 36 does not overlap the electrode lines of the common electrode 32, and a predetermined gap therebetween is, for example, larger than the thickness of the liquid crystal layer 14.

Next, in the present embodiment, the slits 40 of the pixel electrode 36 extend parallel to the longitudinal direction of the sub-pixel P (the vertical direction of FIG. 2), the rubbing direction R1 is sloped with respect to the longitudinal direction of the sub-pixel P by β=5°, and the step difference surfaces 46a of the retardation film 46 shown in FIG. 3 extend parallel to the short-side direction of the sub-pixel P. This configuration is effective in simplification of the shape of the retardation film 46 on the color filter substrate 9.

Second Embodiment of Liquid Crystal Device

Figure 7:
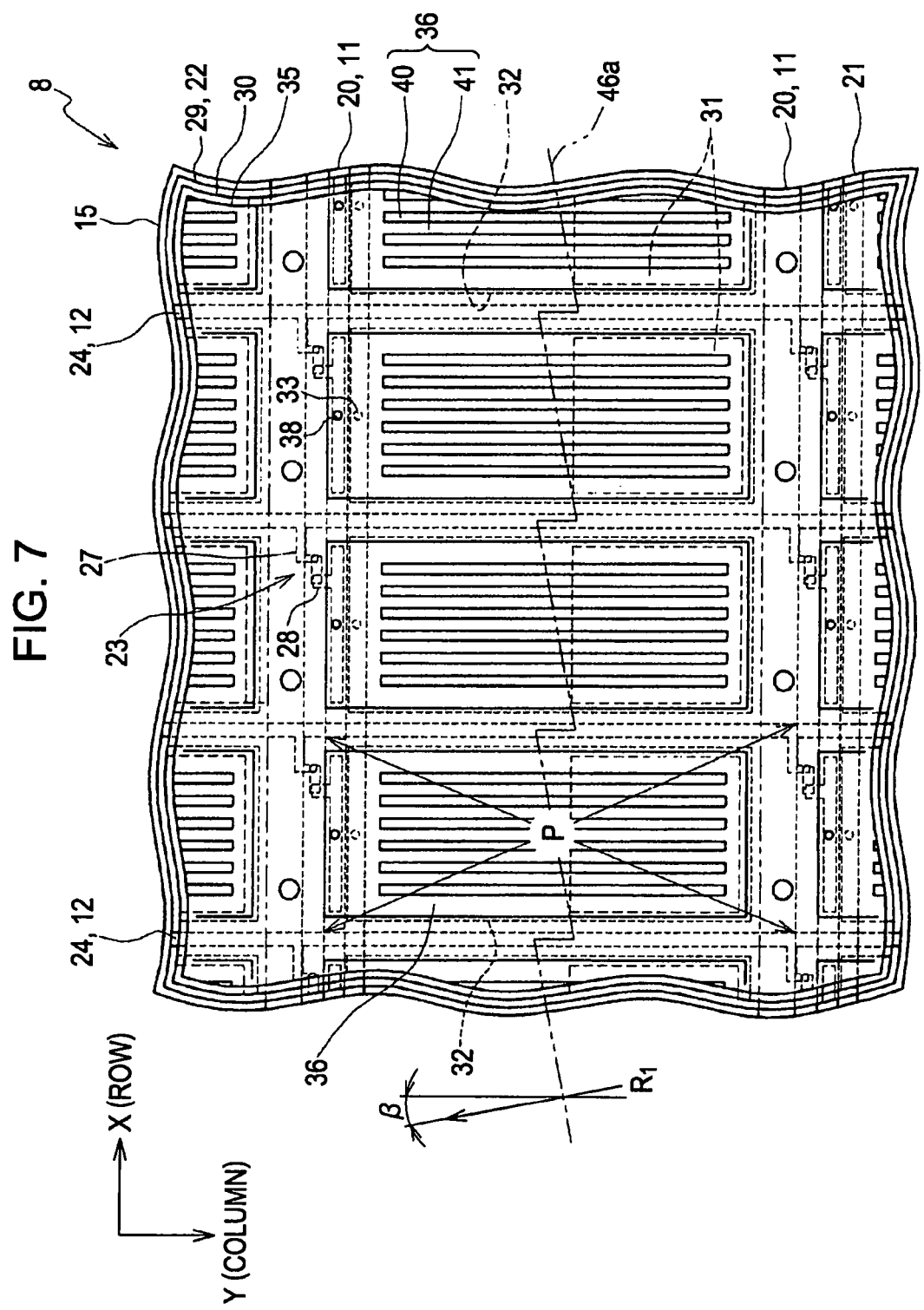
FIG. 7 is a plan view showing main portions of a substrate in a liquid crystal device according to another embodiment of the invention.
Figure 8:
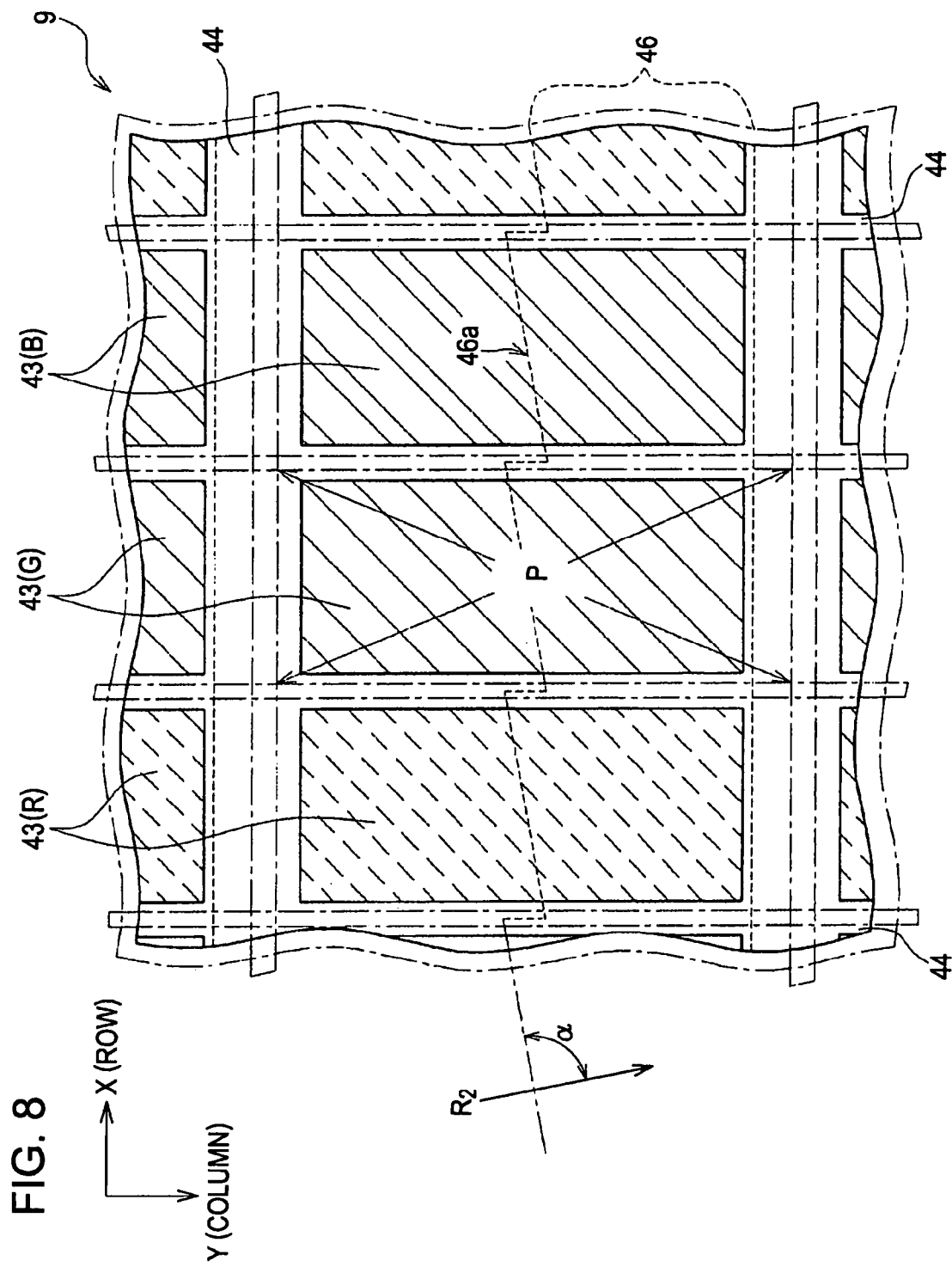
FIG. 8 is a plan view showing main portions of a substrate opposed to the substrate shown in FIG. 7.

FIGS. 7 and 8 show a liquid crystal device according to a second embodiment of the invention. The present embodiment is different from the first embodiment shown in FIGS. 2 and 3 in that the retardation film 46 formed on the color filter substrate 9 as the layer thickness adjustment film is modified in the shape which is viewed in the direction normal to the substrate. In the present embodiment, the same member as FIGS. 2 and 3 are designated by the same reference numerals and the description thereof will be omitted.

In FIG. 7, the slits 40 which are the gaps provided in the pixel electrode 36 linearly extend in the longitudinal direction (the column direction Y) of the sub-pixel P. The retardation film 46 is provided on the color filter substrate 9 shown in FIG. 8 so as to face the slits 40 as the layer thickness adjustment film. In the above-described first embodiment, as shown in FIG. 3, the step difference surfaces 46a of the retardation film 46 extend in the short-side direction (the row direction X) of the sub-pixel P in parallel and the step difference surfaces 46a are linearly connected over the plurality of sub-pixels P. In contrast, as shown in FIG. 8, the step difference surfaces 46a of the retardation film 46 obliquely extend in the short-side direction (the row direction X) of the sub-pixel P in the sub-pixel P. The step difference surfaces 46a are connected to each other in a step difference shape in the boundary between adjacent sub-pixels P. As a whole, the step difference surfaces 46a are formed in a saw teeth shape.

In FIG. 7, the angle β between the rubbing direction R1 at the side of the device substrate 8 and the extending direction (the column direction Y) of the slits 40 is set to 5°. The angle α between the rubbing direction R2 of the color filter substrate 9 shown in FIG. 8 and the step difference surfaces 46a of the retardation film 46 as the layer thickness adjustment film is set to 90°. The rubbing direction R1 of the device substrate 8 shown in FIG. 7 is anti-parallel to the rubbing direction of the color filter substrate 9.

According to the present embodiment, since the angle α between the step difference surfaces 46a of the retardation film 46 and the rubbing direction R2 is 90°, a strong force can be applied to the side difference surface 46a and an alignment failure of the liquid crystal molecules can be prevented with certainty. In addition, the angle β between the rubbing directions R1 and R2 and the extending direction of the slits 40 may be in a range of 5° to 20° in order to obtain the alignment of the liquid crystal molecules for the FFS mode. Even when the angle β is changed in this angle range, the angle β between the rubbing directions R1 and R2 and the step difference surfaces 46a is preferably 90°.

In the present embodiment, as shown in FIG. 7, the device substrate 8 is adhered to the color filter substrate 9 such that the sloped step difference surfaces 46a of the retardation film 46 protrude from the side of the reflective film 31 in plan view. However, the side of the reflective film 31 may coincide with the step difference surfaces 46a in plan view.

Third Embodiment of Liquid Crystal Device

Figure 9:
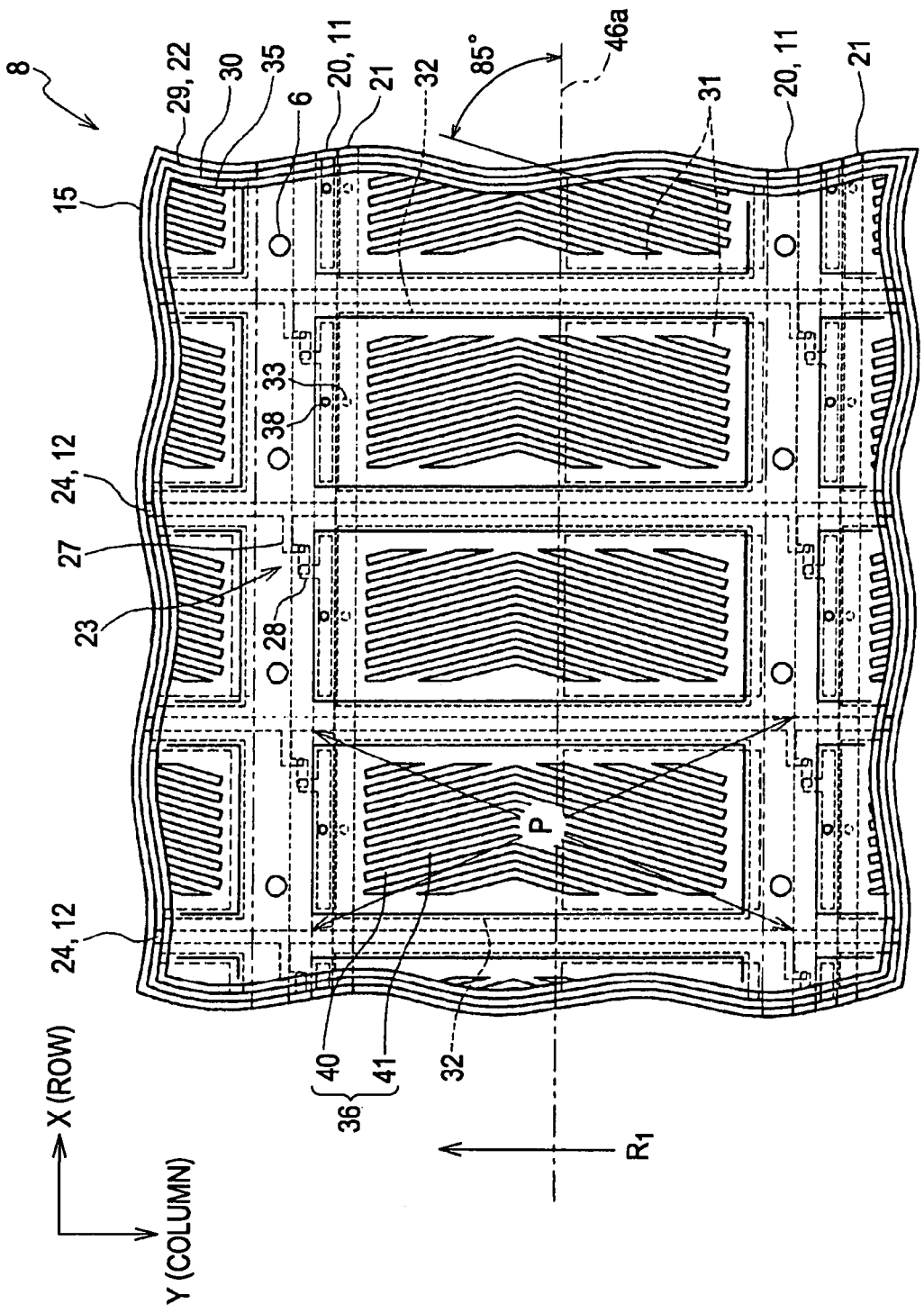
FIG. 9 is a plan view showing main portions of a substrate in a liquid crystal device according to another embodiment of the invention.
Figure 10:
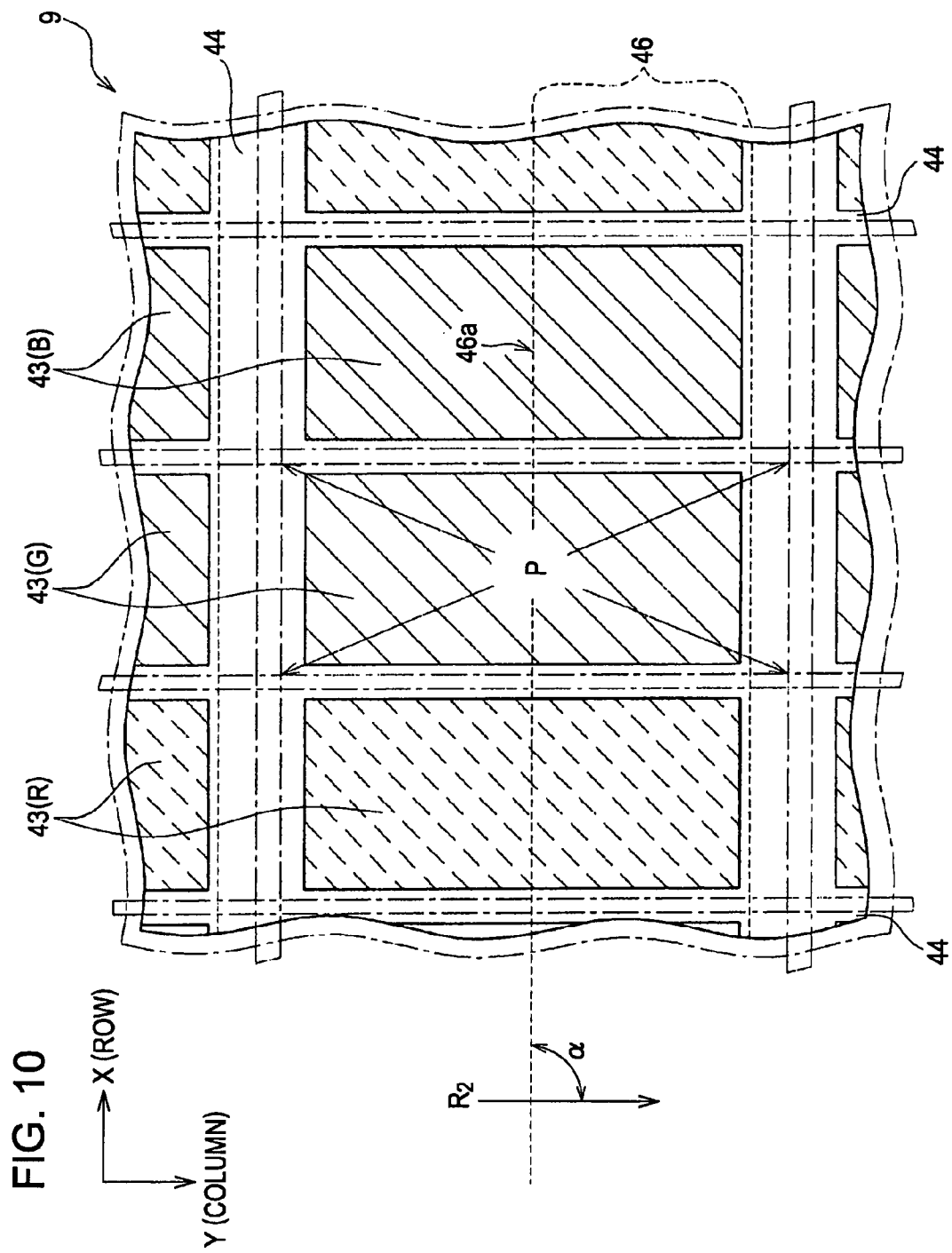
FIG. 10 is a plan view showing main portions of a substrate opposed to the substrate shown in FIG. 9.

FIGS. 9 and 10 show a liquid crystal device according to a third embodiment of the invention. The present embodiment is different from the first embodiment shown in FIGS. 2 and 3 in that the shape of the slits and the electrode lines which are provided as the gaps of the pixel electrode is modified and the rubbing direction is changed. In the present embodiment, the same member as FIGS. 2 and 3 are designated by the same reference numerals and the description thereof will be omitted.

In FIG. 9, the pixel electrode 36 has a plurality of slits 40, which are a plurality of gaps, and a plurality of electrode lines 41 arranged with the slits 40 interposed therebetween. The slits 40 of the pixel electrode 36 are bent at a middle portion of the pixel electrode 36 in the longitudinal direction of the sub-pixel P and the slits 40 which are positioned at one side (upper side of FIG. 9) of the middle portion are sloped by 5° from the longitudinal direction of the sub-pixel P in a counter-clockwise direction in plan view. In addition, the slits 40 which are positioned at the other side (lower side of FIG. 9) of the middle portion are sloped by 5° from the longitudinal direction of the sub-pixel P in a clockwise direction in plan view.

The rubbing direction R1 at the side of the device substrate 8 is parallel to the longitudinal direction (the column direction Y) of the sub-pixel P. The rubbing direction R2 at the side of the color filter substrate 9 shown in FIG. 10 is anti-parallel to the rubbing direction R1 at the side of the device substrate. The angle β between the slits 40 and the rubbing directions R1 and R2 is 5°

The step difference surfaces 46a of the retardation film 46 which are provided on the color filter substrate 9 as the layer thickness adjustment film extend parallel to the short-side direction (the row direction X) of the sub-pixel P. This direction is perpendicular to the source lines 24 on the device substrate 8 and is parallel to the gate lines 20. The angle α between the step difference surfaces 46a of the retardation film 46 and the rubbing directions R1 and R2 is 90°. The rubbing direction R2 at the side of the color filter substrate 9 is opposed to the step difference surfaces 46a of the retardation film 46. The slits 40 are provided at an angle of 85° with respect to the step difference surfaces 46a of the retardation film 46.

According to the present embodiment, since two domains in which the slopes of the slits 40 are linearly symmetrical in one sub-pixel P are provided, it is possible to increase viewability of a display in a high visual region and further improve visual characteristics. Since the angle between the step difference surfaces 46a of the retardation film 46 and the rubbing directions R1 and R2 are accurately 90°, a strong rubbing force can be applied to the step difference surfaces 46a and thus the alignment failure of the liquid crystal molecules can be prevented with certainty.

Fourth Embodiment of Liquid Crystal Device

Figure 11:
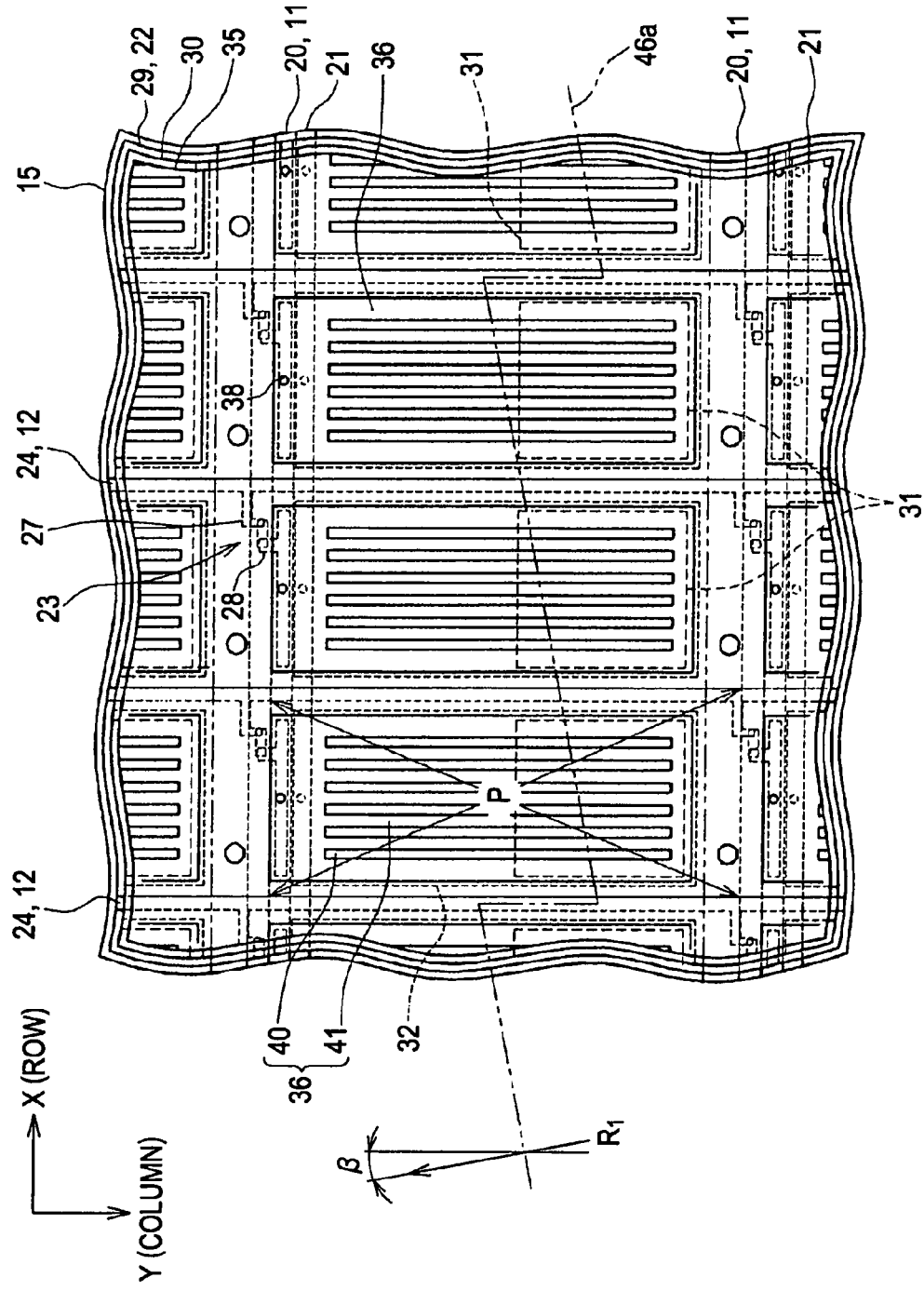
FIG. 11 is a plan view showing main portions of a substrate in a liquid crystal device according to another embodiment of the invention.
Figure 12:
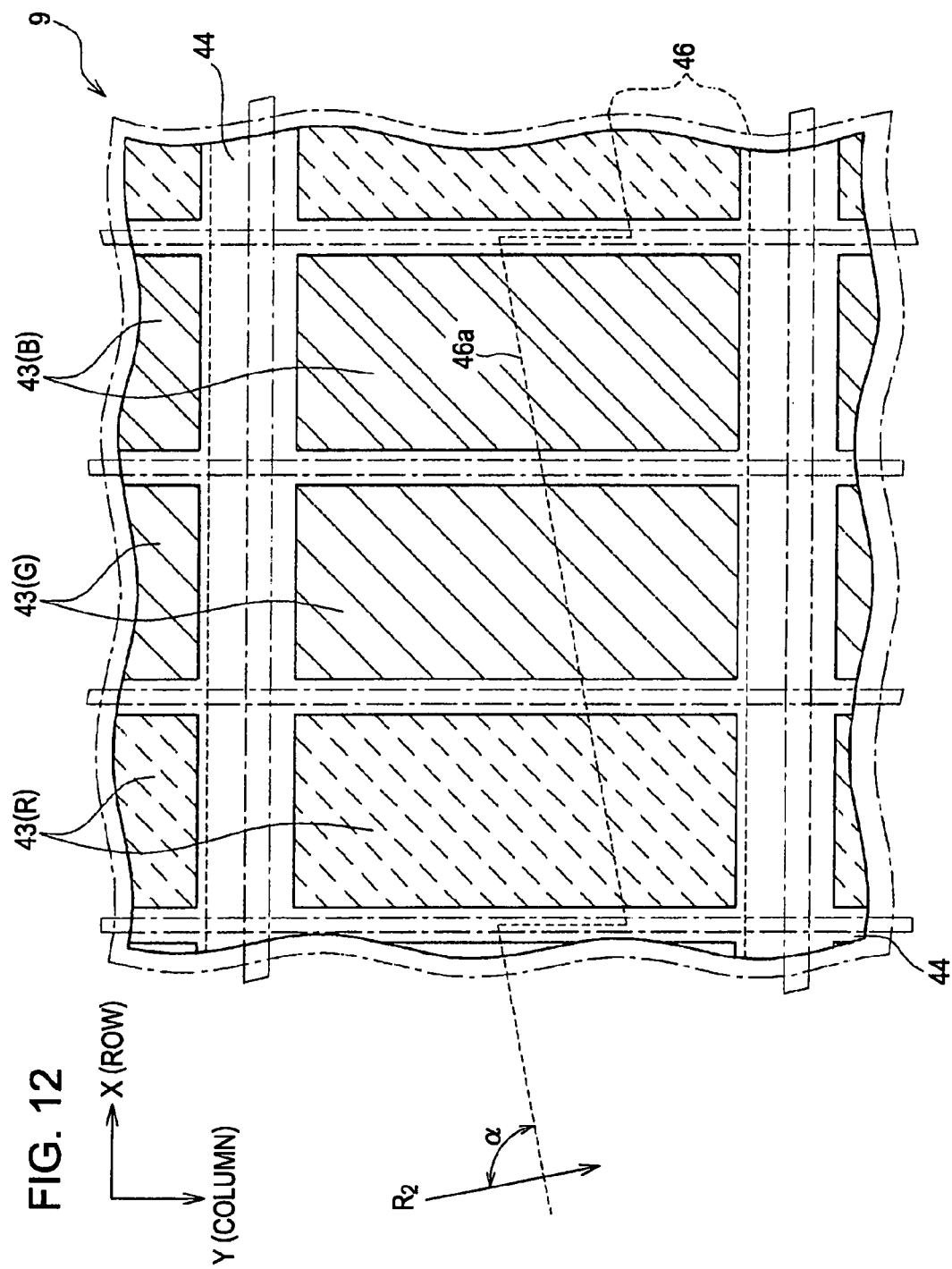
FIG. 12 is a plan view showing main portions of a substrate opposed to the substrate shown in FIG. 11.

FIGS. 11 and 12 show a liquid crystal device according to a fourth embodiment of the invention. The present embodiment is different from the first embodiment shown in FIGS. 2 and 3 in that the shape of the retardation film 46, which is formed on the color filter substrate 9 as the layer thickness adjustment film, in the direction normal to the substrate is modified. In the present embodiment, the same member as FIGS. 2 and 3 are designated by the same reference numerals and the description thereof will be omitted.

In FIG. 11, the pixel electrode 36 has a plurality of slits 40, which are a plurality of gaps, and a plurality of electrode lines 41 arranged with the slits 40 interposed therebetween. The slits 40 linearly extend parallel to the longitudinal direction (the column direction Y) of the sub-pixel P. The rubbing directions R1 and R2 are sloped by 5° to 20° with respect to the longitudinal direction of the sub-pixel P. That is, the angle β between the slits 40 and the rubbing directions R1 and R2 is set to $5° \leq \beta \leq 20°$.

The step difference surfaces 46a of the retardation film 46 are sloped with respect to the short-side direction (the row direction X) of the sub-pixel P such that the angle α between the step difference surfaces 46a and the rubbing direction R2 becomes 90°. The step differences 46a linearly extend in one set of three sub-pixels 43(R), 43(G) and 43(B), instead of being independently sloped in the individual sub-pixel P. That is, the step difference surfaces 46a are linearly connected in the plurality of sub-pixels P. According to this configuration, the slope of the step difference surfaces 46a of the retardation film 46 is repeated in the plurality of sub-pixels P, instead of each sub-pixel P. Accordingly, it is possible to prevent unevenness in the rubbing strength of the boundary between the sub-pixels P.

In addition, although, in the present embodiment, the step difference surfaces 46a are repeatedly sloped in one set of R, G and B, if the sub-pixels configuring one pixel is a combination other than a combination of R, G and B, the shape of the step difference surfaces 46a can be adequately changed according to the combination. For example, one pixel is configured by four colors of R, G, B, and C, the linear slope of the step difference surfaces 46a is repeated in one pixel corresponding to four colors.

In the present embodiment, as shown in FIG. 11, the step difference surfaces 46a of the retardation film 46 are sloped and the side of the reflective film 31 is parallel to the row direction X. That is, the side of the reflective film 31 does not coincide with the step difference surfaces 46a in plan view. Alternatively, the side of the reflective film 31 may coincide with the step difference surfaces 46a in plan view.

Other Embodiments

Although the liquid crystal devices according to the exemplary embodiments of the invention, the invention is not limited to the embodiments and may be variously modified in the scope of the claims. For example, although the TFT is used as the switching element in the above-described embodiments, a 3-terminal switching element may be used instead of the TFT. A 2-terminal switching element such as a thin-film diode (TFD) may be used.

In the above-described embodiments, the FFS mode in which the electrode lines of the pixel electrode overlap the common electrode in plan view is described. However, the invention is applicable to the IPS mode, that is, a display mode having an electrode structure in which the electrode lines of the pixel electrode do not overlap the electrode lines of the common electrode in plan view and gaps are provided between the electrode lines in a direction parallel to the substrate.

First Embodiment of Electronic Apparatus

Figure 13:
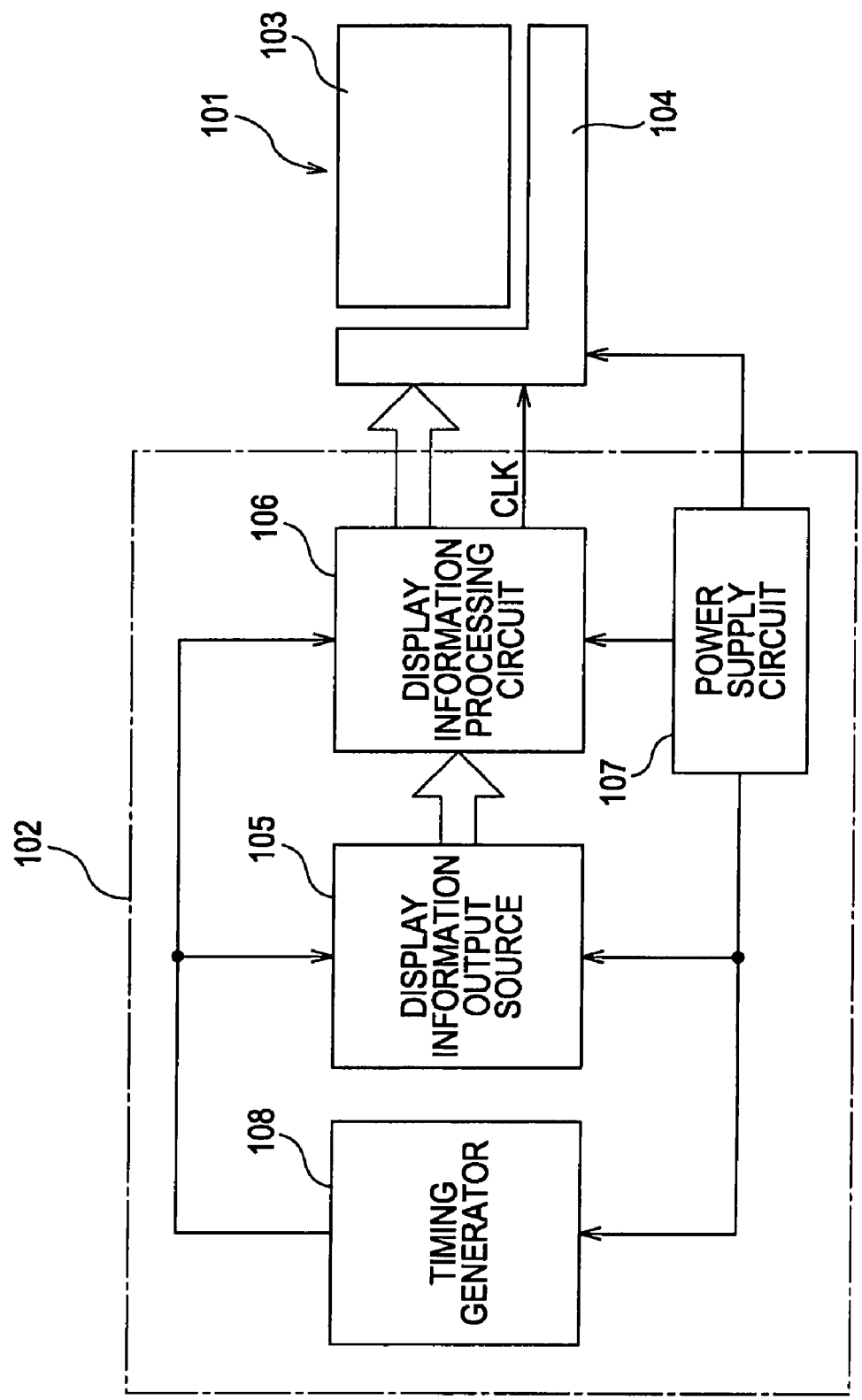
FIG. 13 is a block diagram showing an electronic apparatus according to an embodiment of the invention.

Hereinafter, an electronic apparatus according to an embodiment of the invention will be described. The present embodiment is an example of the invention and the invention is not limited to this embodiment. FIG. 13 shows the electronic apparatus according to the embodiment of the invention. The electronic apparatus shown herein includes a liquid crystal device 101 as an electro-optical device and a control circuit 102 for controlling the same. The liquid crystal device 101 includes a liquid crystal panel 103 and a driving circuit 104. The control circuit 102 includes a display information output source 105, a display information processing circuit 106, a power supply circuit 107 and a timing generator 108.

The display information output source 105 includes a memory such as a random access memory (RAM), a storage unit such as a variety of discs, or a tuning circuit for tuning and outputting a digital image signal and supplies display information such as an image signal of a predetermined format to the display information processing circuit 106 on the basis of a variety of clock signals generated by the timing generator 108.

The display information processing circuit 106 includes a plurality of known circuits such as an amplification inversion circuit, a rotation circuit, a gamma correction circuit or a clamp circuit, processes the input display information, and supplies the image signal to the driving circuit 104 together with a clock signal CLK. Here, the driving circuit 104 includes a scanning line driving circuit, a data line driving circuit and a test circuit. The power supply circuit 107 supplies a predetermined power supply voltage to the components.

The liquid crystal device 101 is, for example, configured by the liquid crystal device 1 shown in FIGS. 1 to 6. According to the liquid crystal device 1, since it is possible to realize a high-quality display with high contrast by adequately setting the rubbing direction with respect to the step difference surface of the layer thickness adjustment film, it is possible to realize a high-quality display in the electronic apparatus using the liquid crystal device 1.

Second Embodiment of Electronic Apparatus

Figure 14:
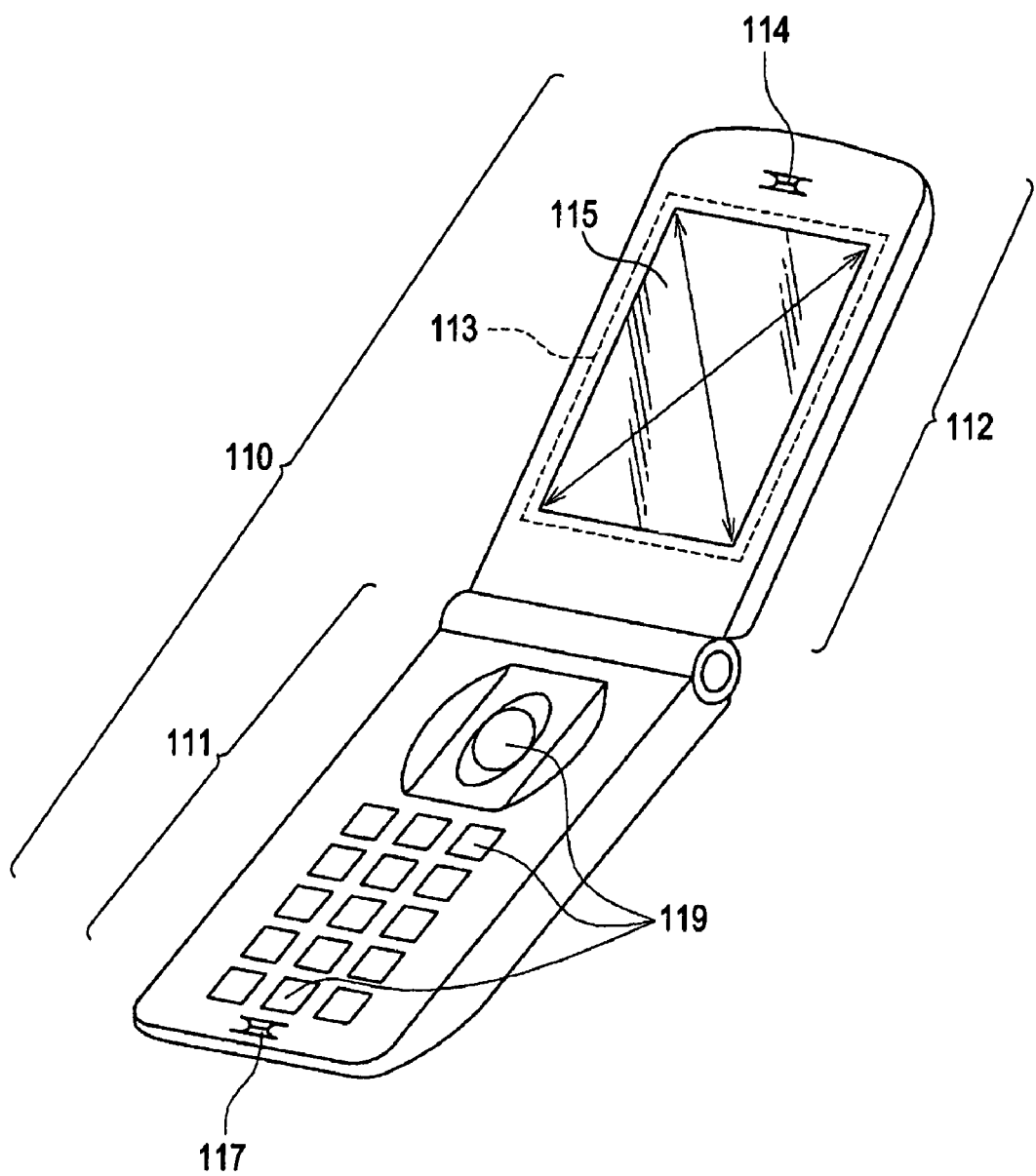
FIG. 14 is a perspective view showing a mobile telephone which is an electronic apparatus according to another embodiment of the invention.

FIG. 14 shows a mobile telephone according to another embodiment of the invention. The mobile telephone 110 which is the electronic apparatus includes a main body unit 111 and a display unit 112 which is openably provided on the main body unit 111. A variety of displays for telephone communication is displayed on a display screen 115 of a display device 113. A control unit for controlling an operation of the display device 113 is a portion of a control unit for controlling the whole mobile telephone and is separately stored from the main body unit 111 or is stored in the main body unit 111 or the display unit 112. The main body unit 111 includes operation buttons 119 and a mouthpiece 117.

The display device 113 is, for example, configured by the liquid crystal device 1 shown in FIGS. 1 to 6. According to the liquid crystal device 1, since it is possible to realize a high-quality display with high contrast by adequately setting the rubbing direction with respect to the step difference surface of the layer thickness adjustment film, it is possible to realize a high-quality display in the mobile telephone 110 using the liquid crystal device 1.

The electronic apparatuses according to the exemplary embodiments of the invention are described, but the invention is not limited to the embodiments and may be variously changed without departing from the ranges described in claims. For example, the invention is not limited to the mobile telephone and is applicable to a personal computer, a liquid crystal television set, a viewfinder-type or direct-view monitor type video tape recorder, a car navigation system, a pager, an electronic organizer, an electronic calculator, a word processor, a workstation, a videophone, a POS terminal, a digital still camera, and an electronic book.

What is claimed is:

1. A liquid crystal device comprising:
   first and second substrates which face each other;
   a liquid crystal layer interposed between the first substrate and the second substrate;
   a reflection display region which is provided in one region of a sub-pixel configuring a control unit of a driving display by the first and second substrates with the liquid crystal layer interposed therebetween and performs a display by reflected light;
   a transmission display region which is provided in the other region of the sub-pixel and performs a display by transmitted light;
   a layer thickness adjustment film which is provided on the second substrate in correspondence with the reflection display region and defines the thickness of the liquid crystal layer to be different from that in the transmission display region; and
   an alignment film which is provided between the second substrate and the liquid crystal layer so as to cover the layer thickness adjustment film and is subjected to a rubbing process,
   wherein the layer thickness adjustment film has a step difference surface at a boundary between the reflection display region and the transmission display region, and when the rubbing process is performed in a direction opposed to the step difference surface and an angle between an extending direction of the step difference surface and a rubbing direction is α, a relationship of $70°≦α≦110°$ is satisfied, and the rubbing process is in a same direction in the reflection display region and the transmission display region;
   first and second electrodes which are provided on the first substrate so as to generate an electric field;
   wherein the second electrode has a plurality of electrode lines which are arranged in parallel with gaps interposed therebetween; and
   when an angle between the gaps and the rubbing direction is β, a relationship of $5°≦β≦20°$ is satisfied.

2. The liquid crystal device according to claim 1, wherein the step difference surface is sloped at an angle smaller than 90° with respect to the surface of the second substrate.

3. The liquid crystal device according to claim 1, wherein:
   the gaps of the second electrode linearly extend parallel to a longitudinal direction of the sub-pixel,
   the rubbing direction is sloped at 5° to 20° with respect to the longitudinal direction of the sub-pixel, and
   the step difference surface of the layer thickness adjustment film extends parallel to a short-side direction of the sub-pixel.

4. The liquid crystal device according to claim 3, further comprising a switching element provided on the first substrate,
   wherein the switching element is connected to a scanning line or a signal line and a longitudinal direction of the sub-pixel is parallel to an extending direction of the scanning line or the signal line.

5. The liquid crystal device according to claim 1, wherein:
   the gaps of the second electrode linearly extend parallel to a longitudinal direction of the sub-pixel,
   the rubbing direction is sloped at 5° to 20° with respect to the longitudinal direction of the sub-pixel, and
   the step difference surface of the layer thickness adjustment film is sloped with respect to a short-side direction of the sub-pixel while being perpendicular to the rubbing direction.

6. The liquid crystal device according to claim 1, wherein:
   the gaps of the second electrode are bent at a middle portion of the second electrode in a longitudinal direction of the sub-pixel, the gaps positioned at one region of the middle portion are sloped by 5° to 20° with respect to the longitudinal direction of the sub pixel in a counterclockwise direction in plan view, and the gaps positioned at the other region of the middle portion are sloped by 5° to 20° with respect to the longitudinal direction of the sub pixel in a clockwise direction in plan view,
   the rubbing direction is parallel to the longitudinal direction of the sub-pixel, and
   the step difference surface of the layer thickness adjustment film extends parallel to a short-side direction of the sub-pixel.

7. The liquid crystal device according to claim 1, wherein:
   the gaps of the second electrode linearly extend parallel to a longitudinal direction of the sub-pixel,
   the rubbing direction is sloped at 5° to 20° with respect to the longitudinal direction of the sub-pixel, and
   the step difference surface of the layer thickness adjustment film is sloped with respect to a short-side direction of the sub-pixel while being perpendicular to the rubbing direction, and linearly extends between the plurality of sub-pixels.

8. The liquid crystal device according claim 1, wherein the layer thickness adjustment film includes a retardation film and retardation of the retardation film is a ½ wavelength.

9. The liquid crystal device according to claim 1, wherein the electrode lines of the second electrode overlap the first electrode in plan view.

10. An electronic apparatus comprising the liquid crystal device according to claim 1.

* * * * *